(12) United States Patent
Nallabolu et al.

(10) Patent No.: US 12,705,827 B2
(45) Date of Patent: Aug. 11, 2026

(54) MULTI-FRAME THREE-DIMENSIONAL (3D) RECONSTRUCTION

(71) Applicant: QUALCOMM Incorporated, San Diego, CA (US)

(72) Inventors: Adithya Reddy Nallabolu, San Diego, CA (US); Gokce Dane, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 197 days.

(21) Appl. No.: 18/465,904

(22) Filed: Sep. 12, 2023

(65) Prior Publication Data

US 2025/0086889 A1 Mar. 13, 2025

(51) Int. Cl.

*G06T 17/00* (2006.01)
*G06T 7/70* (2017.01)
*G06T 7/80* (2017.01)
*G06V 10/74* (2022.01)

(52) U.S. Cl.

CPC ................ *G06T 17/00* (2013.01); *G06T 7/70* (2017.01); *G06T 7/80* (2017.01); *G06V 10/761* (2022.01)

(58) Field of Classification Search

None

See application file for complete search history.

(56) References Cited

U.S. PATENT DOCUMENTS

2015/0193937 A1* 7/2015 Georgiev ................ G06T 7/557 382/168
2018/0315162 A1* 11/2018 Sturm .................. H04N 13/239
2021/0042988 A1* 2/2021 Molyneaux ............. G06F 3/013
2022/0036573 A1* 2/2022 Kim ......................... G06N 3/08
2022/0148207 A1* 5/2022 Varekamp ................. G06T 5/50
2022/0284613 A1* 9/2022 Yin ........................... G06T 7/30
2022/0292699 A1* 9/2022 Zhu ...................... G05D 1/0214
2023/0342507 A1* 10/2023 Beltrand ................... G06T 7/12
2023/0410349 A1* 12/2023 Arnold ...................... G06T 5/70
2024/0096019 A1* 3/2024 Urella ....................... G06T 7/50
2024/0202950 A1* 6/2024 Chen ....................... G06T 7/579
2024/0221275 A1* 7/2024 Narita ..................... G06T 19/20
2024/0257443 A1* 8/2024 Choy ...................... G06T 15/20

* cited by examiner

*Primary Examiner* — Jeffrey J Chow
(74) *Attorney, Agent, or Firm* — Polsinelli LLP/QUALCOMM Incorporated

(57) ABSTRACT

Disclosed are systems and techniques for image processing. For example, a computing device can project a sample location (of a plurality of sample locations) of a block of a scene onto depth frames to determine pixel values for the sample location. Each of the depth frames corresponds to a pose and includes a depth prediction value corresponding to the sample location. The computing device can read the depth prediction values of the depth frames at the pixel values for the sample location on each depth frame of the depth frames. The computing device can obtain 3D points of the depth prediction values in a three-dimensional (3D) space. The computing device can then generate weighted depth prediction values by assigning a weight to each depth prediction value of the depth prediction values. The computing device can update the sample location based on the weighted depth prediction values.

23 Claims, 12 Drawing Sheets

400

MULTI-FRAME THREE-DIMENSIONAL (3D) RECONSTRUCTION

FIELD

This application is related to image processing. In some examples, aspects of this application relate to systems and techniques for multi-frame three-dimensional (3D) reconstruction.

BACKGROUND

The increasing versatility of digital camera products has allowed digital cameras to be integrated into a wide array of devices and has expanded their use to different applications. For example, phones, drones, cars, computers, televisions, and many other devices today are often equipped with camera devices. The camera devices allow users to capture images and/or video (e.g., including frames of images) from any system equipped with a camera device. The images and/or videos can be captured for recreational use, professional photography, surveillance, and automation, among other applications. Moreover, camera devices are increasingly equipped with specific functionalities for modifying images or creating artistic effects on the images. For example, many camera devices are equipped with image processing capabilities for generating different effects on captured images.

In recent decades, there has been a demand for 3D content for computer graphics, virtual reality, and communications, triggering a change in emphasis for the requirements. Many existing systems for constructing 3D models are built around specialized hardware resulting in a high cost, which often cannot satisfy the requirements of these new applications. This need has stimulated the use of digital imaging facilities (e.g., cameras) for 3D reconstruction.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Systems and techniques are described for three-dimensional reconstruction (3DR) of a scene. According to at least one illustrative example, a method for multi-frame 3DR of a scene is provided. The method includes: projecting a sample location, of a plurality of sample locations of a block of a scene, onto a plurality of depth frames to determine pixel values for the sample location, wherein each depth frame of the plurality of depth frames corresponds to a pose and comprises a depth prediction value corresponding to the sample location; reading the depth prediction values of the plurality of depth frames at the pixel values for the sample location on each depth frame of the plurality of depth frames; obtaining 3D points of the depth prediction values in a three-dimensional (3D) space; generating weighted depth prediction values by assigning a weight to each depth prediction value of the depth prediction values; and updating the sample location based on the weighted depth prediction value.

In another illustrative example, an apparatus for three-dimensional reconstruction (3DR) of a scene is provided. The apparatus includes at least one memory and at least one processor coupled to the at least one memory and configured to: project a sample location, of a plurality of sample locations of a block of a scene, onto a plurality of depth frames to determine pixel values for the sample location, wherein each depth frame of the plurality of depth frames corresponds to a pose and comprises a depth prediction value corresponding to the sample location; read the depth prediction values of the plurality of depth frames at the pixel values for the sample location on each depth frame of the plurality of depth frames; obtain 3D points of the depth prediction values in a three-dimensional (3D) space; generate weighted depth prediction values by assigning a weight to each depth prediction value of the depth prediction values; and update the sample location based on the weighted depth prediction values.

In another illustrative example, a non-transitory computer-readable medium is provided that includes stored thereon instructions that, when executed by one or more processors, cause the one or more processors to: project a sample location, of a plurality of sample locations of a block of a scene, onto a plurality of depth frames to determine pixel values for the sample location, wherein each depth frame of the plurality of depth frames corresponds to a pose and comprises a depth prediction value corresponding to the sample location; read the depth prediction values of the plurality of depth frames at the pixel values for the sample location on each depth frame of the plurality of depth frames; obtain 3D points of the depth prediction values in a three-dimensional (3D) space; generate weighted depth prediction values by assigning a weight to each depth prediction value of the depth prediction values; and update the sample location based on the weighted depth prediction values.

In another illustrative example, an apparatus for three-dimensional reconstruction (3DR) of a scene is provided. The apparatus includes: means for projecting a sample location, of a plurality of sample locations of a block of a scene, onto a plurality of depth frames to determine pixel values for the sample location, wherein each depth frame of the plurality of depth frames corresponds to a pose and comprises a depth prediction value corresponding to the sample location; means for reading the depth prediction values of the plurality of depth frames at the pixel values for the sample location on each depth frame of the plurality of depth frames; means for obtaining 3D points of the depth prediction values in a three-dimensional (3D) space; means for generating weighted depth prediction values by assigning a weight to each depth prediction value of the depth prediction values; and means for updating the sample location based on the weighted depth prediction values.

Aspects generally include a method, apparatus, system, computer program product, non-transitory computer-readable medium, user device, user equipment, wireless communication device, and/or processing system as substantially described with reference to and as illustrated by the drawings and specification.

In some aspects, each of the apparatuses described above is, can be part of, or can include a mobile device, a smart or connected device, a camera system, and/or an extended reality (XR) device (e.g., a virtual reality (VR) device, an augmented reality (AR) device, or a mixed reality (MR) device). In some examples, the apparatuses can include or be part of a vehicle, a mobile device (e.g., a mobile telephone or so-called "smart phone" or other mobile device), a wearable device, a personal computer, a laptop computer, a tablet computer, a server computer, a robotics device or system, an aviation system, or other device. In some aspects, the apparatus includes an image sensor (e.g., a camera) or multiple image sensors (e.g., multiple cameras) for capturing one or more images. In some aspects, the apparatus includes one or more displays for displaying one or more images, notifications, and/or other displayable data. In some aspects, the apparatus includes one or more speakers, one or more light-emitting devices, and/or one or more microphones. In some aspects, the apparatuses described above can include one or more sensors. In some cases, the one or more sensors can be used for determining a location of the apparatuses, a state of the apparatuses (e.g., a tracking state, an operating state, a temperature, a humidity level, and/or other state), and/or for other purposes.

Some aspects include a device having a processor configured to perform one or more operations of any of the methods summarized above. Further aspects include processing devices for use in a device configured with processor-executable instructions to perform operations of any of the methods summarized above. Further aspects include a non-transitory processor-readable storage medium having stored thereon processor-executable instructions configured to cause a processor of a device to perform operations of any of the methods summarized above. Further aspects include a device having means for performing functions of any of the methods summarized above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The preceding, together with other features and embodiments, will become more apparent upon referring to the following specification, claims, and accompanying drawings.

BRIEF DESCRIPTION OF THE DRAWINGS

Examples of various implementations are described in detail below with reference to the following figures.

DETAILED DESCRIPTION

Figure 1:
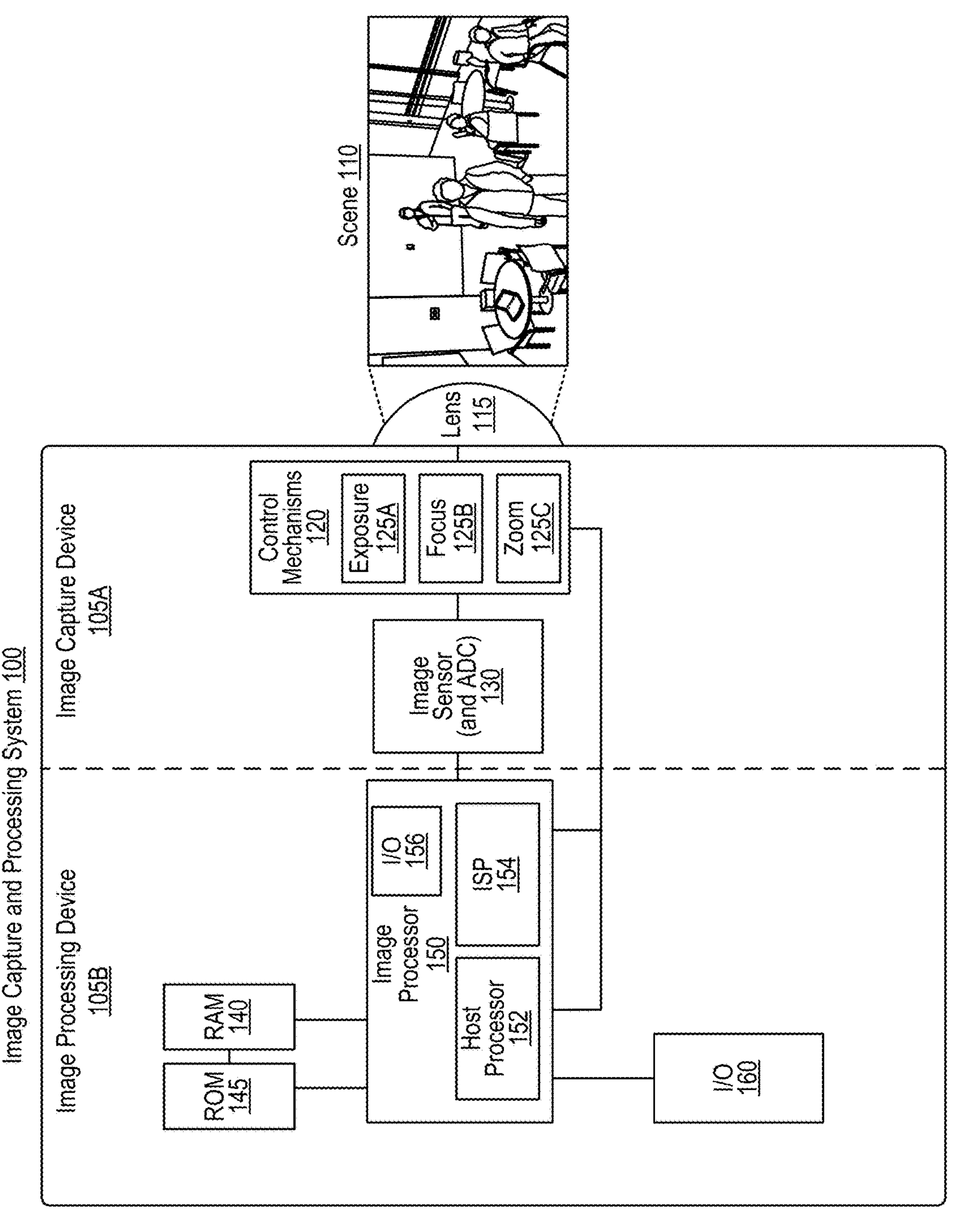
FIG. 1 is a block diagram illustrating an example architecture of an image capture and processing system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

A camera is a device that receives light and captures image frames, such as still images or video frames, using an image sensor. The terms "image," "image frame," and "frame" are used interchangeably herein. Cameras may include processors, such as image signal processors (ISPs), that can receive one or more image frames and process the one or more image frames. For example, a raw image frame captured by a camera sensor can be processed by an ISP to generate a final image. Processing by the ISP can be performed by a plurality of filters or processing blocks being applied to the captured image frame, such as denoising or noise filtering, edge enhancement, color balancing, contrast, intensity adjustment (such as darkening or lightening), tone adjustment, among others. Image processing blocks or modules may include lens/sensor noise correction, Bayer filters, de-mosaicing, color conversion, correction or enhancement/suppression of image attributes, denoising filters, sharpening filters, among others.

Cameras can be configured with a variety of image capture and image processing operations and settings. The different settings result in images with different appearances. Some camera operations are determined and applied before or during capture of the image, such as automatic exposure control (AEC) and automatic white balance (AWB) processing. Additional camera operations applied before, during, or after capture of an image include operations involving zoom (e.g., zooming in or out), ISO, aperture size, f/stop, shutter speed, and gain. Other camera operations can configure post-processing of an image, such as alterations to contrast, brightness, saturation, sharpness, levels, curves, or colors.

As previously mentioned, in recent decades, there has been a demand for three-dimensional (3D) content for computer graphics, virtual reality, and communications, triggering a change in emphasis for the requirements. Many existing systems for constructing 3D models are built around specialized hardware resulting in a high cost, and often cannot satisfy the requirements of these new applications. The requirements have stimulated the use of digital imaging (e.g., using images from cameras) for 3D reconstruction.

In some cases, volume blocks (e.g., voxels) can be utilized to reconstruct a 3D scene from two-dimensional (2D) images, such as stereo images obtained from a stereo camera. A voxel represents a value on a regular grid in 3D space. As with pixels in a 2D bitmap, voxels do not have their position (e.g., coordinates) explicitly encoded within their values. Instead, rendering systems infer the position of a voxel based upon its position relative to other voxels (e.g., its position in the data structure that makes up a single volumetric image).

In some examples, a system can perform 3D reconstruction (3DR) using depth frames and an associated live camera pose estimate for 3D scene reconstruction. In 3D surface reconstruction, the system can model the scene as a 3D sparse volumetric representation (e.g., referred to as a volume grid). The volume grid can contain a set of voxel blocks, which are each indexed by their position in space with a sparse data representation (e.g., only storing blocks that surround an object and/or obstacle).

In one illustrative example, a system can perform 3DR to reconstruct a 3D scene from 2D depth frames and color frames. The system can divide the scene into 3D blocks (e.g., voxels or voxel blocks, as noted previously). For example, the system may project each voxel onto a 2D depth frame and a 2D color frame to determine the depth and color of the voxel. Once all of the voxels that refer to (e.g., are associated with) this depth frame and color frame are updated accordingly, the process can repeat for a new depth frame and color frame pair or set.

As previously mentioned, in 3DR, 3D scenes are represented using a 3D volume of points called voxels, where each voxel typically carries implicit surface information, such as in the form of a truncated Signed Distance Function (TSDF) value and a weight for depth integration. The TSDF value is a measure of distance of the voxel from a surface, and the weight is a measure of the reliability of the TSDF value. A TSDF weight can be estimated using various approaches, such as a simple counter (e.g., a binary weight of 1 or 0), based on a depth range, or from a confidence of the depth predictions. Currently, all of these approaches are based on individual frame predictions.

A traditional 3DR system uses a sequence of depth maps with their corresponding six (6) degrees of freedom (DoF) poses as an input. The depth maps can be generated using existing deep learning (DL) or non-DL algorithms. The depth maps are integrated into a 3D volume by calculating a signed distance function (SDF) at each sample location of a voxel.

Current 3DR algorithms process each frame independently (e.g., a single depth map and their corresponding 6 DoF pose is processed as independent measurements). Since the frames in a video sequence are correlated, the depth and 6 DoF pose predictions on these frames should be consistent with respect to the scene. Existing 3DR algorithms do not have a mechanism to determine if the input is noisy or corrupted. As such, systems and techniques that provide for improved 3DR (e.g., using multiple frames and/or refined inputs) can be beneficial.

In one or more aspects, systems, apparatuses, processes (also referred to as methods), and computer-readable media (collectively referred to herein as "systems and techniques") are described herein for providing multi-frame 3DR, which can provide for an improved 3D reconstruction of a scene. For instance, in one or more examples, the systems and techniques provide a framework to use multiple depth maps from a scene as input to 3DR to enhance the 3DR quality. During 3DR integration, a sample location can be projected onto multiple available camera poses (e.g., 6 DoF poses associated with depth frames), and depth prediction values can be read at the corresponding locations on a depth image plane. The depth predictions from multiple camera poses can be treated as multiple measurements at the same 3D location.

These multiple measurements at a 3D location can be used to calculate a reliability measure (e.g., a confidence level). The reliability measure can be used as a weight (e.g., the weight can be assigned based on the reliability measure), which can be used to combine multiple TSDF integration values and/or to filter inconsistent depth values from being used for the 3DR.

For a static scene, the depth and 6 DoF pose predictions (e.g., which are used as inputs to 3DR) should be consistent across multiple frames to produce a quality 3DR. In one or more examples, the systems and techniques provide a framework to finetune (e.g., refine) one or both of these inputs (e.g., the depth prediction values and 6 DoF poses, which are estimations themselves) by enforcing the inputs to be consistent with respect to the scene. One of the inputs (e.g., depth prediction values or pose) can be assumed to be reliable, and the other input can be refined (e.g., by optimization) to be consistent with respect to the scene. This approach can improve the quality of the inputs and, thereby, improves the quality of the 3DR algorithm. For example, assuming a reliable 6-Dof frame pose, depth predictions from multiple previous frames can be used to finetune a depth prediction of a current frame. Alternatively, depth predictions (e.g., which may be obtained from reliable sensors, such as time of flight (TOF) sensors) can be assumed to be reliable, and the previous frame poses can be used to optimize or refine a pose of a current frame. Enforcing this constraint can induce intelligent behavior to the 3DR algorithm, which can allow for the 3DR algorithm to decide whether an input meets the quality necessary for being included within the 3D integration of 3DR.

In one or more aspects, the disclosed systems and techniques have a number of advantages. In one or more examples, the disclosed multi-frame 3DR algorithm is simple and efficient to implement within hardware. In some examples, for the multi-frame 3D algorithm, a reliability measure is computed as a weight (e.g., a gradient weighting) in 3DR, based on input predictions from multiple frames (e.g., depth frames), as opposed to based on only a counter (e.g., a binary counter weighting) from a single frame (e.g., a single depth frame).

In one or more examples, the systems and techniques can also filter out non-static objects from a scene for 3D integration of 3DR. For example, inconsistent depth prediction values can be due to dynamic objects, such as humans moving in the scene. The disclosed multi-frame 3DR can distinguish dynamic objects in the scene by measuring inconsistencies of the depth prediction values at the sample locations associated with the dynamic objects, and can avoid using (e.g., filter out) those inconsistent depth prediction values for the 3D integration of 3DR.

Further aspects of the systems and techniques are described with respect to the figures.

FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 bends the light toward the image sensor 130. The light received by the lens 115 passes through an aperture controlled by one or more control mechanisms 120 and is received by an image sensor 130.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo, thereby adjusting focus. In some cases, additional lenses may be included in the device 105A, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 1210 discussed with respect to the computing system 1200. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/1120, read-only memory (ROM) 145/1125, a cache 1112, a memory unit 1115, another storage device 1130, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1135, any other input devices 1145, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the device 105B and one or more peripheral devices, over which the device 105B may receive data from the one or more peripheral device and/or transmit data to the one or more peripheral devices. The I/O 160 may include one or more wireless transceivers that enable a wireless connection between the device 105B and one or more peripheral devices, over which the device 105B may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

The host processor 152 can configure the image sensor 130 with new parameter settings (e.g., via an external control interface such as I2C, I3C, SPI, GPIO, and/or other interface). In one illustrative example, the host processor 152 can update exposure settings used by the image sensor 130 based on internal processing results of an exposure control algorithm from past image frames.

In some examples, the host processor 152 can perform electronic image stabilization (EIS). For instance, the host processor 152 can determine a motion vector corresponding to motion compensation for one or more image frames. In some aspects, host processor 152 can position a cropped pixel array ("the image window") within the total array of pixels. The image window can include the pixels that are used to capture images. In some examples, the image window can include all of the pixels in the sensor, except for a portion of the rows and columns at the periphery of the sensor. In some cases, the image window can be in the center of the sensor while the image capture device 105A is stationary. In some aspects, the peripheral pixels can surround the pixels of the image window and form a set of buffer pixel rows and buffer pixel columns around the image window. Host processor 152 can implement EIS and shift the image window from frame to frame of video, so that the image window tracks the same scene over successive frames (e.g., assuming that the subject does not move). In some examples in which the subject moves, host processor 152 can determine that the scene has changed.

In some examples, the image window can include at least 95% (e.g., 95% to 99%) of the pixels on the sensor. The first region of interest (ROI) (e.g., used for AE and/or AWB) may include the image data within the field of view of at least 95% (e.g., 95% to 99%) of the plurality of imaging pixels in the image sensor 130 of the image capture device 105A. In some aspects, a number of buffer pixels at the periphery of the sensor (outside of the image window) can be reserved as a buffer to allow the image window to shift to compensate for jitter. In some cases, the image window can be moved so that the subject remains at the same location within the adjusted image window, even though light from the subject may impinge on a different region of the sensor. In another example, the buffer pixels can include the ten topmost rows, ten bottommost rows, ten leftmost columns and ten rightmost columns of pixels on the sensor. In some configurations, the buffer pixels are not used for AF, AE or AWB when the image capture device 105A is stationary and the buffer pixels not included in the image output. If jitter moves the sensor to the left by twice the width of a column of pixels between frames, the EIS algorithm can be used to shift the image window to the right by two columns of pixels, so the captured image shows the same scene in the next frame as in the current frame. Host processor 152 can use EIS to smoothen the transition from one frame to the next.

In some aspects, the host processor 152 can also dynamically configure the parameter settings of the internal pipelines or modules of the ISP 154 to match the settings of one or more input image frames from the image sensor 130 so that the image data is correctly processed by the ISP 154. Processing (or pipeline) blocks or modules of the ISP 154 can include modules for lens/sensor noise correction, demosaicing, color conversion, correction or enhancement/suppression of image attributes, denoising filters, sharpening filters, among others. The settings of different modules of the ISP 154 can be configured by the host processor 152. Each module may include a large number of tunable parameter settings. Additionally, modules may be co-dependent as different modules may affect similar aspects of an image. For example, denoising and texture correction or enhancement may both affect high frequency aspects of an image. As a result, a large number of parameters are used by an ISP to generate a final image from a captured raw image.

In some cases, the image capture and processing system 100 may perform one or more of the image processing functionalities described above automatically. For instance, one or more of the control mechanisms 120 may be configured to perform auto-focus operations, auto-exposure operations, and/or auto-white-balance operations. In some embodiments, an auto-focus functionality allows the image capture device 105A to focus automatically prior to capturing the desired image. Various auto-focus technologies exist. For instance, active autofocus technologies determine a range between a camera and a subject of the image via a range sensor of the camera, typically by emitting infrared lasers or ultrasound signals and receiving reflections of those signals. In addition, passive auto-focus technologies use a camera's own image sensor to focus the camera, and thus do not require additional sensors to be integrated into the camera. Passive AF techniques include Contrast Detection Auto Focus (CDAF), Phase Detection Auto Focus (PDAF), and in some cases hybrid systems that use both. The image capture and processing system 100 may be equipped with these or any additional type of auto-focus technology.

Figure 2:
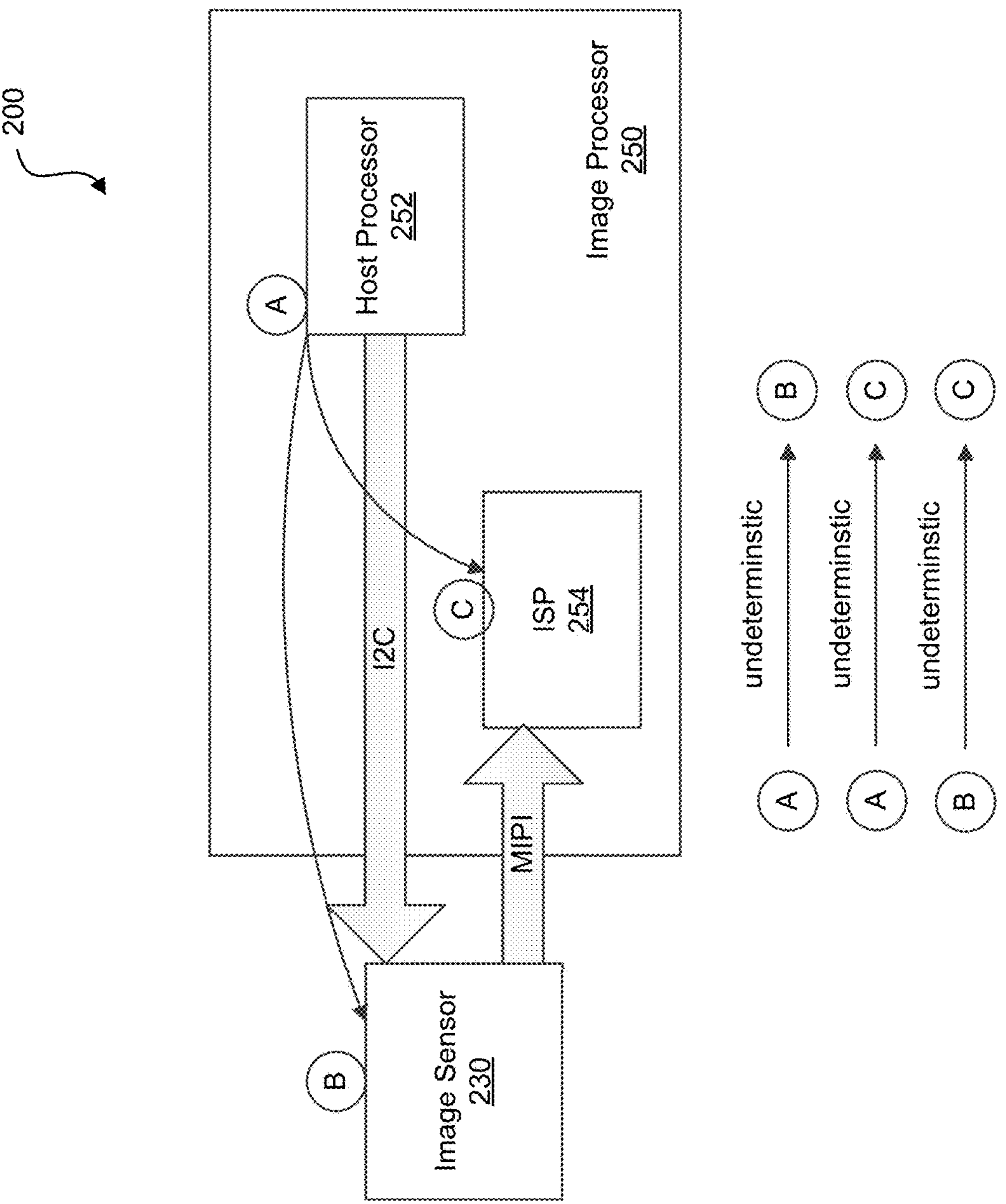
FIG. 2 is a block diagram illustrating an example of interactions between components of an image capture and processing system, in accordance with some examples.

Synchronization between the image sensor 130 and the ISP 154 is important in order to provide an operational image capture system that generates high quality images without interruption and/or failure. FIG. 2 is a block diagram illustrating an example of an image capture and processing system 200 including an image processor 250 (including host processor 252 and ISP 254) in communication with an image sensor 230. The configuration shown in FIG. 2 is illustrative of traditional synchronization techniques used in camera systems. In general, the host processor 252 attempts to provide synchronization between the image sensor 230 and the ISP 254 using fixed periods of time by separately communicating with the image sensor 230 and the ISP 254. For example, in traditional camera systems, the host processor 252 communicates with the image sensor 230 (e.g., over an I2C port) and programs the image sensor 230 parameters with a first fixed period of time, such as 2-frame periods ahead of when that image frame will be processed by the ISP 254. The host processor 252 communicates with the ISP 254 (e.g., over an internal AHB bus or other interface) and programs the ISP 254 parameter settings with a second fixed period of time, such as 1-frame period ahead of when that image frame will be processed by the ISP 254.

The image sensor 230 can send image frames to the ISP 254 (B-to-C in FIG. 2), such as over an MIPI CSI-2 PHY port or interface, or other suitable interface. However, the communication between the host processor 252 and the image sensor 230 (shown as from A to B) is undeterministic. Similarly, the communication between the image sensor 230 and the ISP 254 (shown as from B to C) and the communication the host processor 252 and the ISP 254 (shown as from A to C) are also undeterministic. For example, there can be varying latencies in programming of the image sensor 230 and the ISP 254 by the host processor 252, which can result in a parameter settings mismatch between the sensor and the ISP. The latencies can be due to high CPU usage, congestion in one or more I/O ports, and/or due to other factors.

Figure 3:
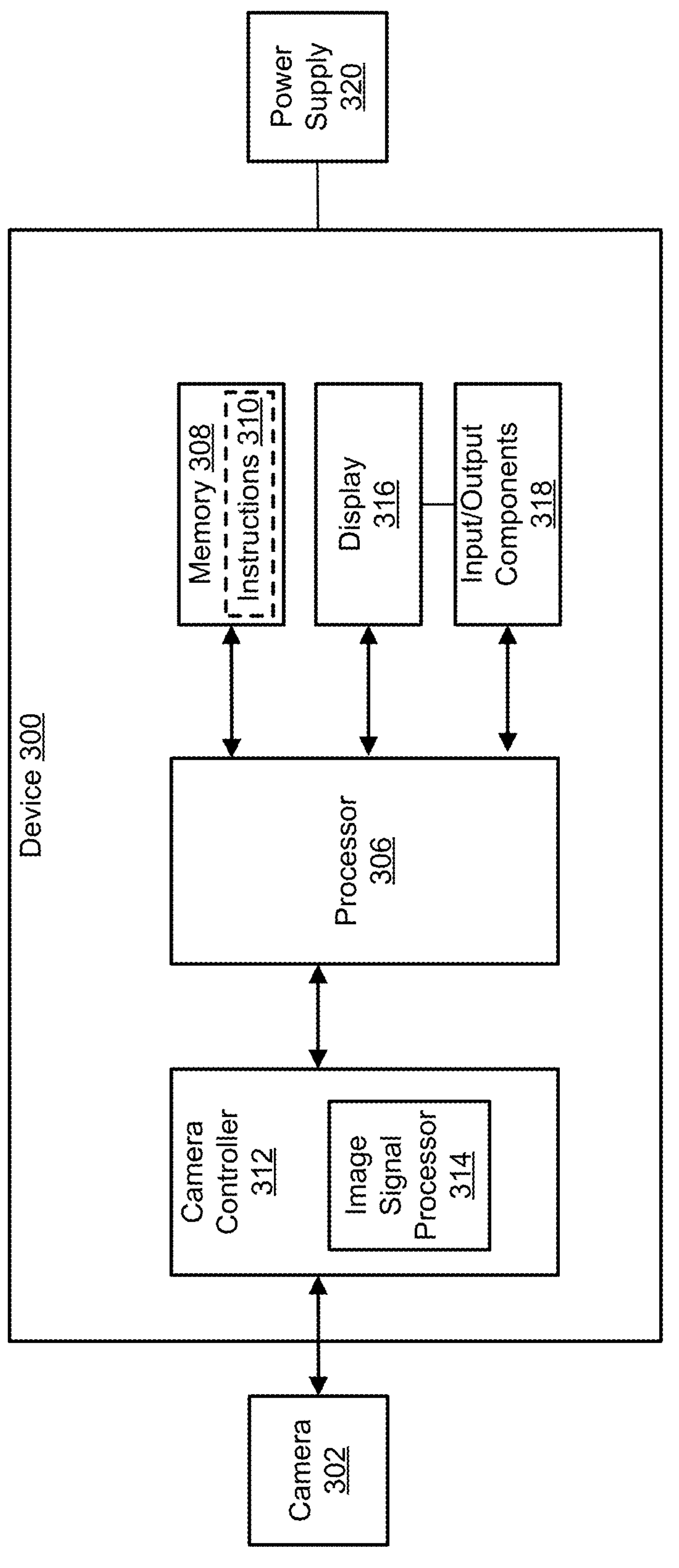
FIG. 3 is a block diagram illustrating an example device that may employ a color metadata buffer for 3D reconstruction, in accordance with some examples.

FIG. 3 is a block diagram of an example device 300 that may employ a color metadata buffer for 3D reconstruction. Device 300 may include or may be coupled to a camera 302, and may further include a processor 306, a memory 308 storing instructions 310, a camera controller 312, a display 316, and a number of input/output (I/O) components 318 including one or more microphones (not shown). The example device 300 may be any suitable device capable of capturing and/or storing images or video including, for example, wired and wireless communication devices (such as camera phones, smartphones, tablets, security systems, smart home devices, connected home devices, surveillance devices, internet protocol (IP) devices, dash cameras, laptop computers, desktop computers, automobiles, drones, aircraft, and so on), digital cameras (including still cameras, video cameras, and so on), or any other suitable device. The device 300 may include additional features or components not shown. For example, a wireless interface, which may include a number of transceivers and a baseband processor, may be included for a wireless communication device. Device 300 may include or may be coupled to additional cameras other than the camera 302. The disclosure should not be limited to any specific examples or illustrations, including the example device 300.

Camera 302 may be capable of capturing individual image frames (such as still images) and/or capturing video (such as a succession of captured image frames). Camera 302 may include one or more image sensors (not shown for simplicity) and shutters for capturing an image frame and providing the captured image frame to camera controller 312. Although a single camera 302 is shown, any number of cameras or camera components may be included and/or coupled to device 300. For example, the number of cameras may be increased to achieve greater depth determining capabilities or better resolution for a given FOV.

Memory 308 may be a non-transient or non-transitory computer readable medium storing computer-executable instructions 310 to perform all or a portion of one or more operations described in this disclosure. Device 300 may also include a power supply 320, which may be coupled to or integrated into the device 300.

Processor 306 may be one or more suitable processors capable of executing scripts or instructions of one or more software programs (such as the instructions 310) stored within memory 308. In some aspects, processor 306 may be one or more general purpose processors that execute instructions 310 to cause device 300 to perform any number of functions or operations. In additional or alternative aspects, processor 306 may include integrated circuits or other hardware to perform functions or operations without the use of software. While shown to be coupled to each other via processor 306 in the example of FIG. 3, processor 306, memory 308, camera controller 312, display 316, and I/O components 318 may be coupled to one another in various arrangements. For example, processor 306, memory 308, camera controller 312, display 316, and/or I/O components 318 may be coupled to each other via one or more local buses (not shown for simplicity).

Display 316 may be any suitable display or screen allowing for user interaction and/or to present items (such as captured images and/or videos) for viewing by the user. In some aspects, display 316 may be a touch-sensitive display. Display 316 may be part of or external to device 300. Display 316 may comprise an LCD, LED, OLED, or similar display. I/O components 318 may be or may include any suitable mechanism or interface to receive input (such as commands) from the user and/or to provide output to the user. For example, I/O components 318 may include (but are not limited to) a graphical user interface, keyboard, mouse, microphone and speakers, and so on.

Camera controller 312 may include an image signal processor (ISP) 314, which may be (or may include) one or more image signal processors to process captured image frames or videos provided by camera 302. For example, ISP 314 may be configured to perform various processing operations for automatic focus (AF), automatic white balance (AWB), and/or automatic exposure (AE), which may also be referred to as automatic exposure control (AEC). Examples of image processing operations include, but are not limited to, cropping, scaling (e.g., to a different resolution), image stitching, image format conversion, color interpolation, image interpolation, color processing, image filtering (e.g., spatial image filtering), and/or the like.

In some example implementations, camera controller 312 (such as the ISP 314) may implement various functionality, including imaging processing and/or control operation of camera 302. In some aspects, ISP 314 may execute instructions from a memory (such as instructions 310 stored in memory 308 or instructions stored in a separate memory coupled to ISP 314) to control image processing and/or operation of camera 302. In other aspects, ISP 314 may include specific hardware to control image processing and/or operation of camera 302. ISP 314 may alternatively or additionally include a combination of specific hardware and the ability to execute software instructions.

While not shown in FIG. 3, in some implementations, ISP 314 and/or camera controller 312 may include an AF module, an AWB module, and/or an AE module. ISP 314 and/or camera controller 312 may be configured to execute an AF process, an AWB process, and/or an AE process. In some examples, ISP 314 and/or camera controller 312 may include hardware-specific circuits (e.g., an application-specific integrated circuit (ASIC)) configured to perform the AF, AWB, and/or AE processes. In other examples, ISP 314 and/or camera controller 312 may be configured to execute software and/or firmware to perform the AF, AWB, and/or AE processes. When configured in software, code for the AF, AWB, and/or AE processes may be stored in memory (such as instructions 310 stored in memory 308 or instructions stored in a separate memory coupled to ISP 314 and/or camera controller 312). In other examples, ISP 314 and/or camera controller 312 may perform the AF, AWB, and/or AE processes using a combination of hardware, firmware, and/or software. When configured as software, AF, AWB, and/or AE processes may include instructions that configure ISP 314 and/or camera controller 312 to perform various image processing and device managements tasks, including the techniques of this disclosure.

As previously mentioned, recently, there has been a demand for 3D content for computer graphics, virtual reality, and communications, that has triggered a change in emphasis for the requirements. Many existing systems for constructing 3D models are built around specialized hardware that results in a high cost, which often cannot satisfy the requirements of these new applications. This need has stimulated the use of digital imaging facilities (e.g., cameras) for 3D reconstruction.

Currently, volume blocks (e.g., voxels) are often used to reconstruct a 3D scene from 2D images (e.g., stereo images obtained from a stereo camera). A voxel will be used herein as an example of blocks (e.g., 3D blocks). A voxel can represent a value on a regular grid in 3D space. As with pixels in a 2D bitmap, voxels themselves do not have their position (e.g., coordinates) explicitly encoded within their values. Instead, rendering systems infer the position of a voxel based upon its position relative to other voxels (e.g., its position in the data structure that makes up a single volumetric image).

3DR utilizes depth frames with an associated live camera pose estimate for scene reconstruction. In 3D surface reconstruction, the scene can be modeled as a 3D sparse volumetric representation (e.g., that can be referred to as a volume grid). The volume grid contains a set of voxel blocks that are indexed by their position in space with a sparse data representation (e.g., only storing blocks that surround an object and/or obstacle). For example, a room with a size of four meters (m) by four m by five m may be modeled with a volume grid having a total of 1.25 million (M) voxel blocks, where each voxel block has a four centimeter block dimension. In some examples, for this room, the occupied voxel blocks may only be about ten to fifteen percent.

Figure 4:
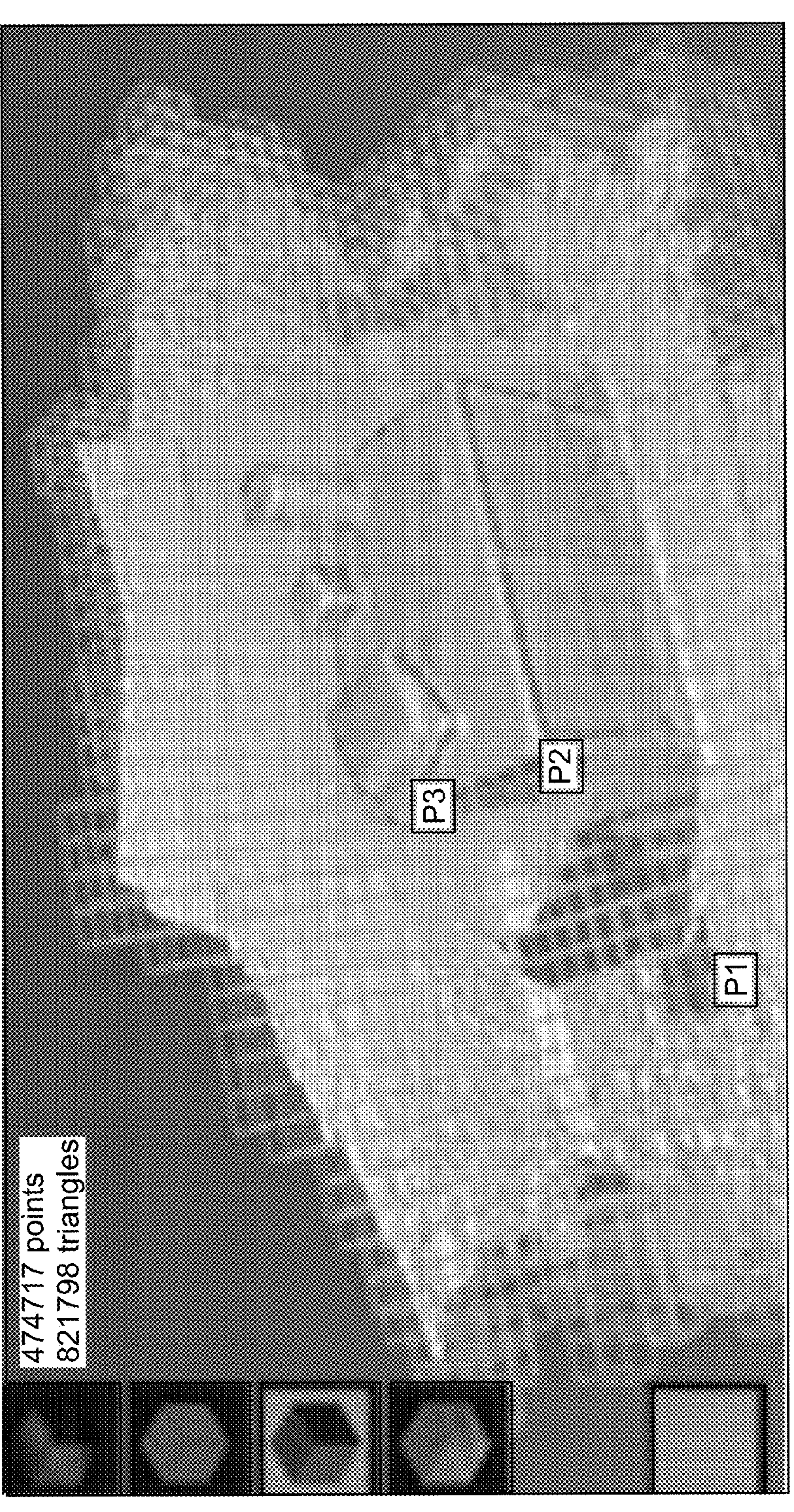
FIG. 4 is a diagram illustrating an example of a 3D surface reconstruction of a scene modeled as a volume grid, in accordance with some examples.

FIG. 4 shows an example of a scene that has been modeled as a 3D sparse volumetric representation for 3DR. In particular, FIG. 4 is a diagram illustrating an example of a 3D surface reconstruction 400 of a scene modeled with an overlay of a volume grid containing voxel blocks. For 3DR, a camera (e.g., a stereo camera) may take photos of the scene from various different view points and angles. For example, a camera may take a photo of the scene when the camera is located at position P1. Once multiple photos have been taken of the scene, a 3D representation of the scene can be constructed by modeling the scene as a volume grid with 3D blocks (e.g., voxel blocks).

In one or more examples, an image (e.g., a photo) of a 3D block (e.g., voxel) located at point P2 within the scene may be taken by a camera (e.g., a stereo camera) located at point P1 with a certain camera pose (e.g., at a certain angle). The camera can capture both depth and color. From this image, it can be determined that there is an object located at point P2 with a certain depth and, as such, there is a surface. As such, it can be determined that there is an object that maps to this particular 3D block. An image of a 3D block located at point P3 within the scene may be taken by the same camera located at the point P1 with a different camera pose (e.g., with a different angle). From this image, it can be determined that there is an object located at point P3 with a certain depth and having a surface. As such, it can be determined that there is an object that maps to this particular 3D block (e.g., voxel). An integrate process can occur where all of the blocks within the scene are passed through an integrate function. The integrate function can determine depth information for each of the blocks from the depth frame and can update each block to indicate whether the block has a surface or not. The blocks that are determined to have a surface can then be updated with a color.

In one or more examples, the pose of the camera can indicate the location of the camera (e.g., which may be indicated by location coordinates X, Y) and the angle that the camera (e.g., which is the angle that the camera is positioned in for capturing the image). Each block (e.g., the block located at point P2) has a location (e.g., which may be indicated by location coordinates X, Y, Z). The pose of the camera and the location of each block can be used to map each block to world coordinates for the whole scene.

In one or more examples, to achieve fast multiple access to 3D blocks (e.g., voxels), instead of using a large memory lookup table, various different volume block representations may be used to index the blocks in the 3D scene to store data where the measurements are observed. Volume block representations that may be employed can include, but are not limited to, a hash map lookup, an octree, and a large blocks implementation.

Figure 5:
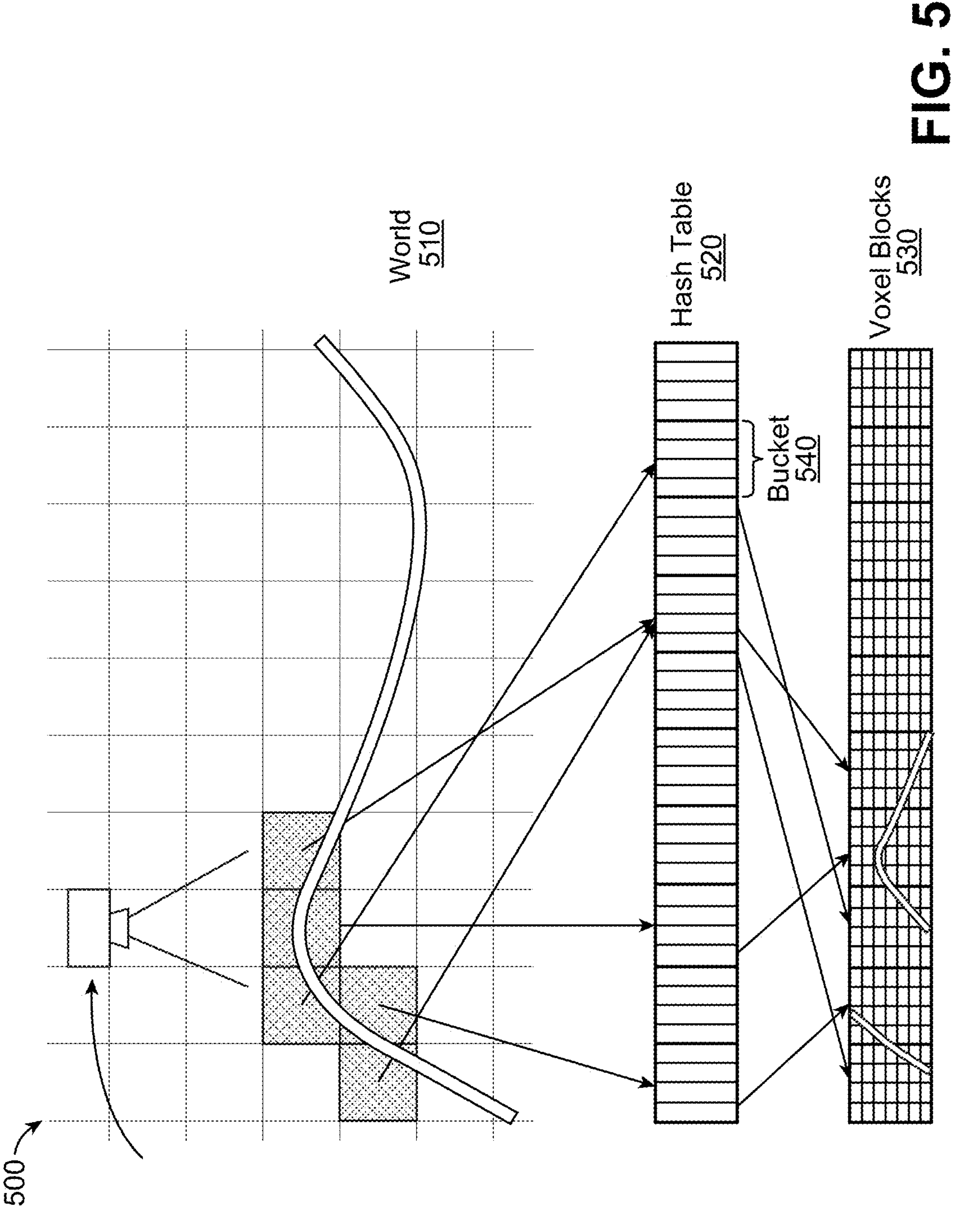
FIG. 5 is a diagram illustrating an example of a hash mapping function for indexing blocks (e.g., voxels) in a volume grid, in accordance with some examples.

FIG. 5 shows an example of a hash map lookup type of volume block representation. In particular, FIG. 5 is a diagram illustrating an example of a hash mapping function 500 for indexing voxel blocks 530 in a volume grid. In FIG. 5, a volume grid is shown with world coordinates 510. Also shown in FIG. 5 are a hash table 520 and voxel blocks 530. In one or more examples, a hash function can be used to map the integer world coordinates 510 into hash buckets 540 within the hash table 520. The hash buckets 540 can each store a small array of points to regular grid voxels blocks 530. Each voxel block 530 contains data that can be used for depth integration.

Figure 6:
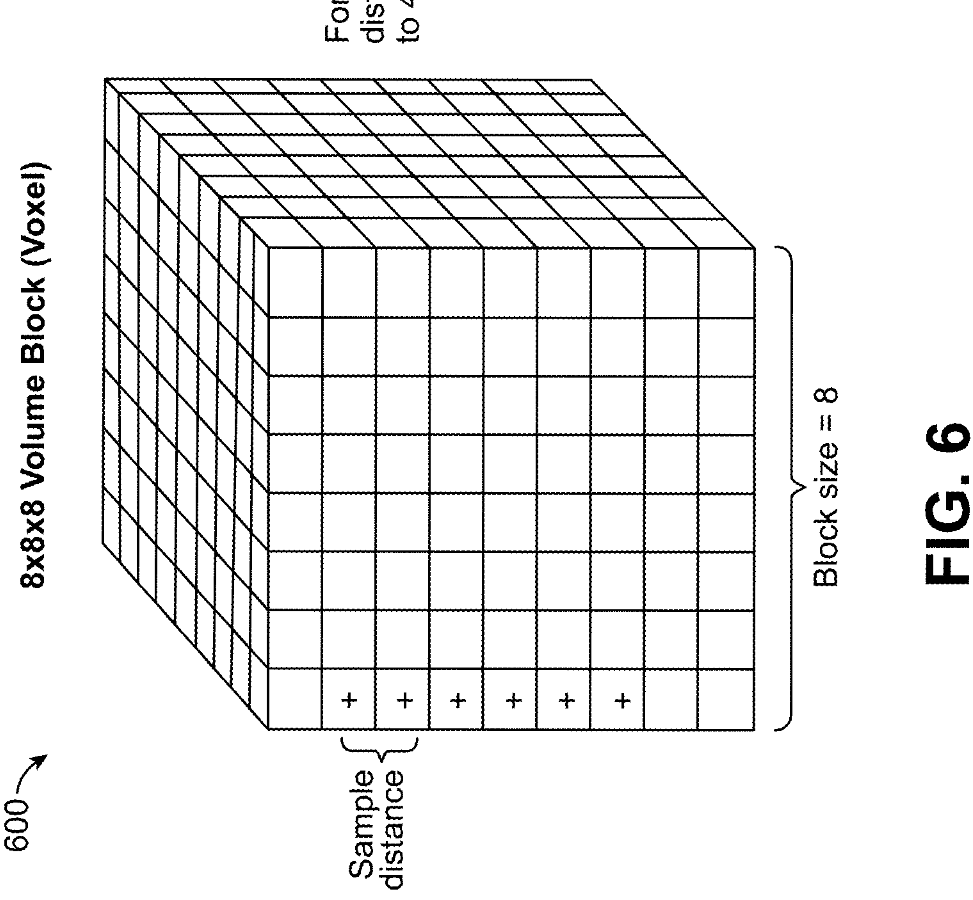
FIG. 6 is a diagram illustrating an example of a block (e.g., a voxel), in accordance with some examples.

FIG. 6 is a diagram illustrating an example of a volume block (e.g., a voxel) 600. In FIG. 6, the voxel 600 is shown to have a block size of eight. For example, a 0.5 centimeter (cm) sample distance for an eight by eight by eight voxel can correspond to a four cm by four cm by four cm voxel.

In one or more examples, each voxel (e.g., voxel 600) can contain truncated signed distance function (TSDF) samples, a RGB, and a weight. TSDF is a function that measures the distance d of each pixel from the surface of an object to the camera. A voxel with a positive value for d can indicate that the voxel is located in front of a surface, a voxel with a negative value for d can indicate that the voxel is located inside (or behind) the surface, and a voxel with a zero value for d can indicate that the voxel is located on the surface. The distance d is truncated to [−1, 1], such that:

$$tsdf = \begin{cases} -1, & \text{if } d \leq -\text{ramp} \\ \dfrac{d}{\text{ramp}}, & \text{if } -\text{ramp} < d < \text{ramp} \\ 1, & \text{if } d \geq \text{ramp} \end{cases}$$

$$\text{sample} \cdot tsdf = \left( \frac{\text{sample} \cdot \text{weight} * \text{sample} \cdot tsdf + tsdf}{\text{sample} \cdot \text{weight} + 1} \right)$$

A TSDF integration or fusion process can be employed that updates the TSDF values and weights with each new observation from the sensor (e.g., camera).

Figure 7:
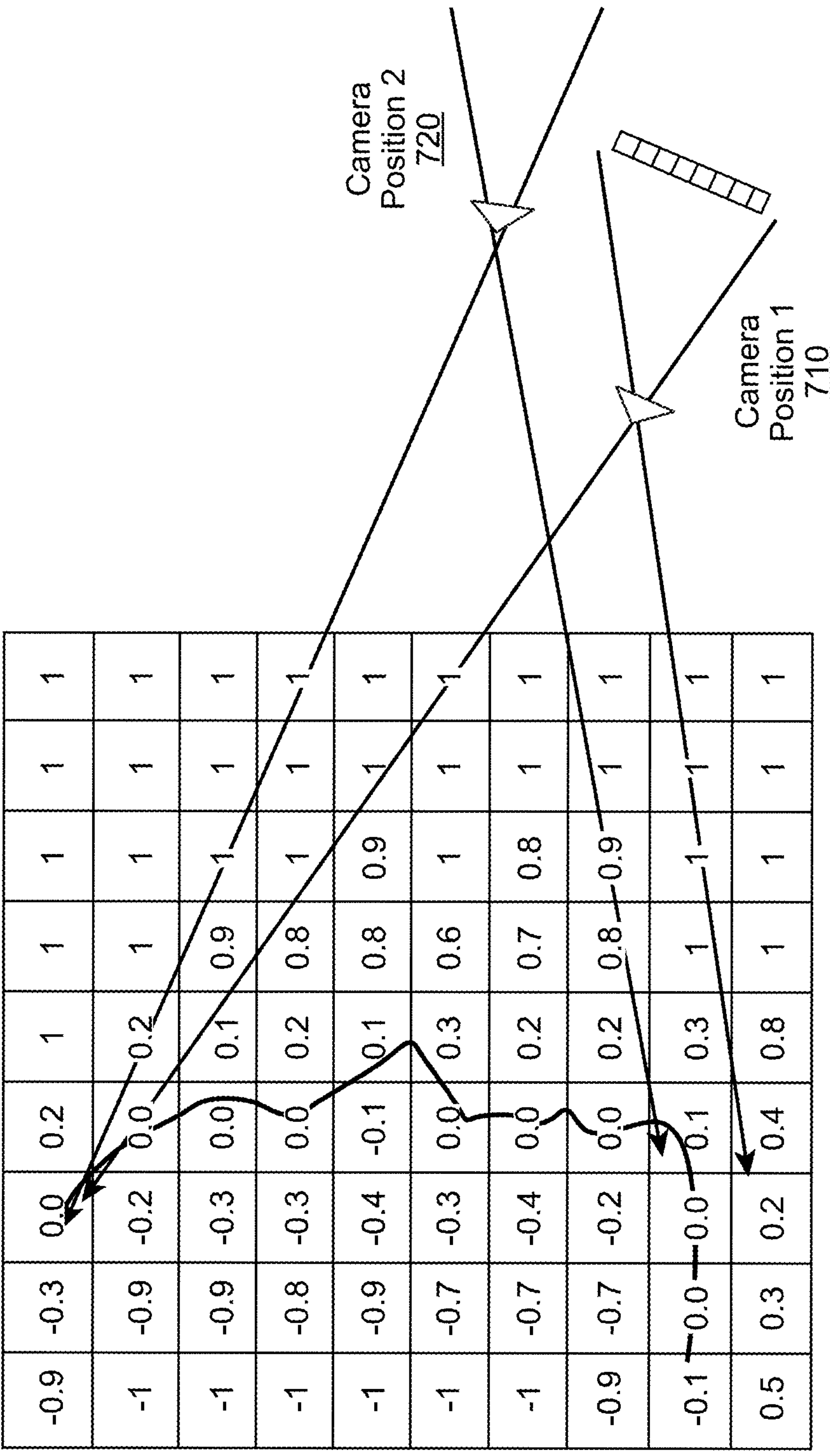
FIG. 7 is a diagram illustrating an example of a truncated signed distance function (TSDF) volume reconstruction, in accordance with some examples.

FIG. 7 is a diagram illustrating an example of a TSDF volume reconstruction 700. In FIG. 7, a voxel grid including a plurality of voxels is shown. A camera is shown to be obtaining images of a scene (e.g., person's face) from two different camera positions (e.g., camera position 1 710 and camera position 2 720). During operation for TSDF, for each new observation (e.g., image) from the camera (e.g., for each image taken by the camera at a different camera position), the distance (d) of a corresponding pixel of each voxel within the voxel grid can be obtained. The distance (d) can be subtracted from the distance of the voxel itself, and that result can be divided by a truncation threshold value threshold. The TSDF values (and color values) can be updated in the global memory. In FIG. 7, the voxels with positive values are shown to be located in front of the person's face, the voxels with negative values are shown to be located inside of the person's face, and the voxels with zero values are shown to be located on the surface of the person's face.

As previously mentioned, in 3DR, 3D scenes are represented using a 3D volume of points called voxels. Typically, each voxel carries implicit surface information (e.g., in the form of a TSDF value and a weight for depth integration). The TSDF value is a measure of distance of the voxel from a surface. The weight is a measure of the reliability of the TSDF value. A TSDF weight may be estimated using various approaches, such as a simple counter (e.g., a binary weight, such as 1 or 0), based on a depth range, or from a confidence of the depth predictions. All of these current approaches are based on individual frame predictions.

A traditional 3DR system generally uses a sequence of depth maps with their corresponding 6 DoF poses as an input. The depth maps may be generated using existing DL or non-DL algorithms. The depth maps can be integrated into a 3D volume by calculating a SDF at each sample location of a voxel.

Current 3DR algorithms process each frame independently (e.g., a single depth map and their corresponding 6 DoF pose is processed as independent measurements). Since the frames in a video sequence are correlated, the depth and 6 DoF pose predictions on these frames should be consistent with respect to the scene. Existing 3DR algorithms do not have any mechanism to determine a noise or corrupt input. As such, systems and techniques that provide for improved 3DR (e.g., using multiple frames and/or refined inputs) can be useful.

In one or more aspects, the systems and techniques employ a multi-frame 3DR that can provide for an improved 3D reconstruction of a scene. In one or more examples, the systems and techniques provide a framework for using multiple depth maps from a scene as input to the 3DR algorithm to enhance the 3DR quality. During 3DR integration, a sample location may be projected onto multiple available camera poses (e.g., 6 DoF poses, each associated with a depth frame), and depth prediction values can be read at the corresponding locations on a depth image plane. The depth predictions from multiple camera poses may be treated as multiple measurements at the same 3D location. In one or more examples, these multiple measurements at a 3D location may be used to calculate a reliability measure (e.g., a confidence level). The reliability measure can be used as a weight (e.g., the weight may be assigned based on the reliability measure) that may be used as an indicator to combine multiple TSDF integration values and/or to filter inconsistent depth values from being used for the 3DR.

Figure 8:
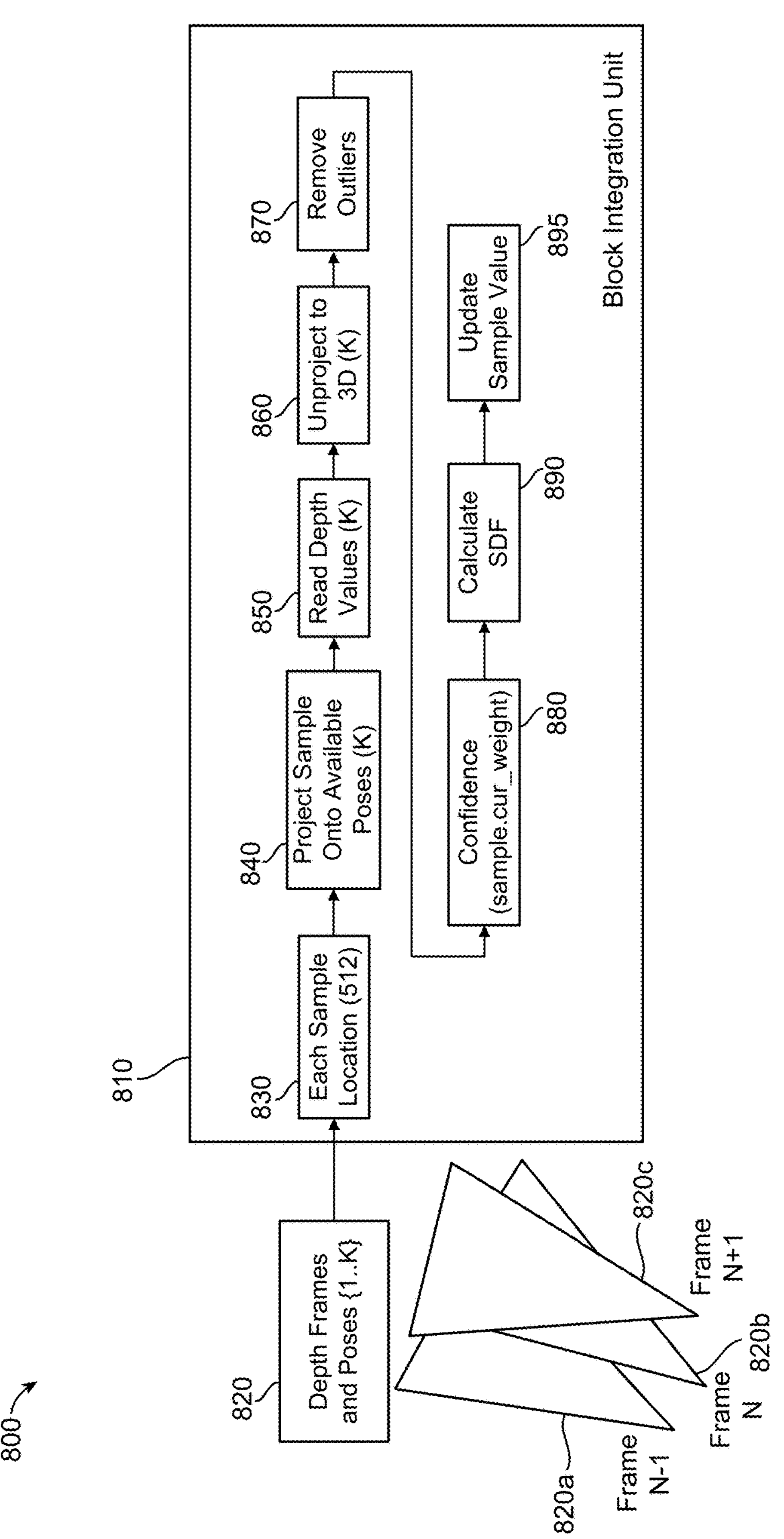
FIG. 8 is a block diagram illustrating an example of a procedure for multi-frame 3D reconstruction, in accordance with some examples.

FIG. 8 shows an example of a procedure for the disclosed multi-frame 3DR. In particular, FIG. 8 is a block diagram illustrating an example of a procedure 800 for multi-frame 3DR. In FIG. 8, a block integration unit 810 is shown. One or more processors (e.g., processor 1210 of FIG. 12 or other processor(s)) may perform the process within the block integration unit 810 of the procedure 800.

The block integration unit 810 may perform 3D integration for 3DR on a per sample location basis (e.g., the process flow in the block integration unit 810 may be performed for only one sample location at a time). In one or more examples, the block integration unit 810 may perform 3D integration for 3DR on all of the samples concurrently (e.g., the process flow in the block integration unit 810 may be performed for multiple sample locations at a time). Each sample location may be one sample location of a plurality of sample locations of a block (e.g., a voxel, such as voxel 600 of FIG. 6) of a scene. Adjacent sample locations may be separated from each other by a sample distance (e.g., sample distance shown on voxel block 600 of FIG. 6). The block may be in the form of an eight by eight by eight (e.g., 8×8×8) matrix that includes a total of 512 sample locations.

The procedure 800 of FIG. 8 can use multiple depth frames 820, where each depth frame 820 corresponds to a pose (e.g., a 6 DoF pose). Each depth frame 820 includes depth prediction values corresponding to the sample locations. In one or more examples, the depth frames 820 may include previous depth frame 820*a* (e.g., depth frame N−1), current depth frame 820*b* (e.g., depth frame N), and, optionally, future depth frame 820*c* (e.g., depth frame N+1). The future depth frame 820*c* may be used when the depth estimation is running at a higher frame rate than the 3DR.

During operation of the procedure 800 of FIG. 8, K number of depth frames 820 along with K number of poses corresponding to the depth frames may be input into the block integration unit 810. At block 840 of the block integration unit 810, one or more processors (e.g., processor 1210 of FIG. 12 or other processor(s)) may determine pixels values for a sample location (e.g., one of the sample locations of the voxel, such as sample location at block 820) by projecting the sample location onto the K number of depth frames 820. At block 850 of the block integration unit 810, the one or more processors may read the depth prediction values at the pixel values (e.g., which are two-dimensional (2D) coordinates, such as x,y) for the sample location on each of the K number depth frames 820 corresponding to the K number of poses (e.g., Depth-val1(x1,y1)@pose 1, . . . , Depth-valK(xK,yK)@poseK).

At block 860 of the block integration unit 810, the one or more processors can unproject the depth prediction values at the pixel values (e.g., x,y values) onto a 3D space to obtain 3D points (e.g., which are 3D coordinates, such as x,y,z) of the depth prediction values in the 3D space (e.g., 3D-point1 (x1',y1',z1')@pose1, . . . , 3D-pointK'(xK',yK',zK') @poseK). In one or more examples, the 3D space may be a camera coordinate space. In one or more examples, the unprojecting of the depth prediction values at the pixel values may be performed by using camera intrinsic parameters.

At block 870 of the block integration unit 810, the one or more processors may remove outlier depth prediction values from the depth prediction values. In one or more examples, the one or more processors can generate a Gaussian distribution of the depth prediction values. The one or more processors can calculate a variance, and can filter out depth prediction values that exceed a variance threshold (e.g., a three sigma value). In one or more examples, the one or more processors can filter out depth prediction values based on a calculated mean or median point of the depth prediction values.

In the procedure 800, at block 880 of the block integration unit 810, the one or more processors can estimate a confidence level for each of the remaining depth prediction values by generating a Gaussian distribution of the remaining depth prediction values and calculating a variance. Depth prediction values with larger variances can be estimated to have low confidence levels, and depth prediction values with smaller variances can be estimated to have high confidence levels. The one or more processors may then assign weights (e.g., each a SFD fusion weight, such as a sample.cur_weight), which may be gradient weights, to the remaining depth prediction values, based on their respective estimated confidence level, to produce weighted depth prediction values.

At block 890 of the block integration unit 810, the one or more processors may calculate a SDF of the sample location by using a calculated mean (or median) of the weighted depth prediction values. At block 895 of the block integration unit 810, the one or more processors may update the SDF at the sample location based on the weighted average using the current SDF weight (e.g., sample.cur_weight) of the sample location and the previous SDF weight (e.g., sample.prev_weight) for the sample location. In one or more examples, the updated SDF for the sample location may be calculated by:

$$\text{sample} \cdot tsdf = \left( \frac{\begin{array}{c}\text{sample} \cdot \text{cur\_weight} * \text{sample} \cdot \text{cur\_tsdf} + \\ \text{sample} \cdot \text{prev\_weight} * \text{sample} \cdot \text{prev\_tsdf}\end{array}}{\text{sample} \cdot \text{cur\_weight} + \text{sample} \cdot \text{prev\_weigt}} \right)$$

where sample.cur_weight is the current SFD weight of the sample location, sample.cur_TSDF is the current TSDF of the sample location, sample.prev_weight is the previous SFD weight of the sample location, and sample.prev_TSDF is the previous TSDF of the sample location.

As previously mentioned, for a static scene, the depth and 6 DoF pose predictions (e.g., which are used as inputs to 3DR, as shown in FIG. 8) should be consistent across multiple frames to produce a quality 3DR. In some examples, the systems and techniques may provide a framework to finetune (e.g., refine) one or both of these inputs (e.g., the depth prediction values and 6 DoF poses, which are estimations themselves) by enforcing the inputs to be consistent with respect to the scene. In one or more examples, one of the inputs (e.g., depth prediction values or pose) may be assumed to be reliable, while the other input may be refined (e.g., by optimization) to be consistent with respect to the scene. This approach may improve the quality of the inputs and, as such, lead to an improvement in the quality of the 3DR. For example, assuming a reliable 6-Dof frame pose, depth predictions from multiple previous frames may be used to finetune (e.g., refine) a depth prediction of a current frame. Alternatively, depth predictions (e.g., which may be obtained from reliable sensors, such as TOF sensors) can be assumed to be reliable, and the previous frame poses can be used to optimize or refine a pose of a current frame. Enforcing this constraint can induce intelligent behavior to the 3DR algorithm, which can allow for the 3DR algorithm to decide whether an input meets the quality necessary for being included within the 3D integration of 3DR.

Figure 9:
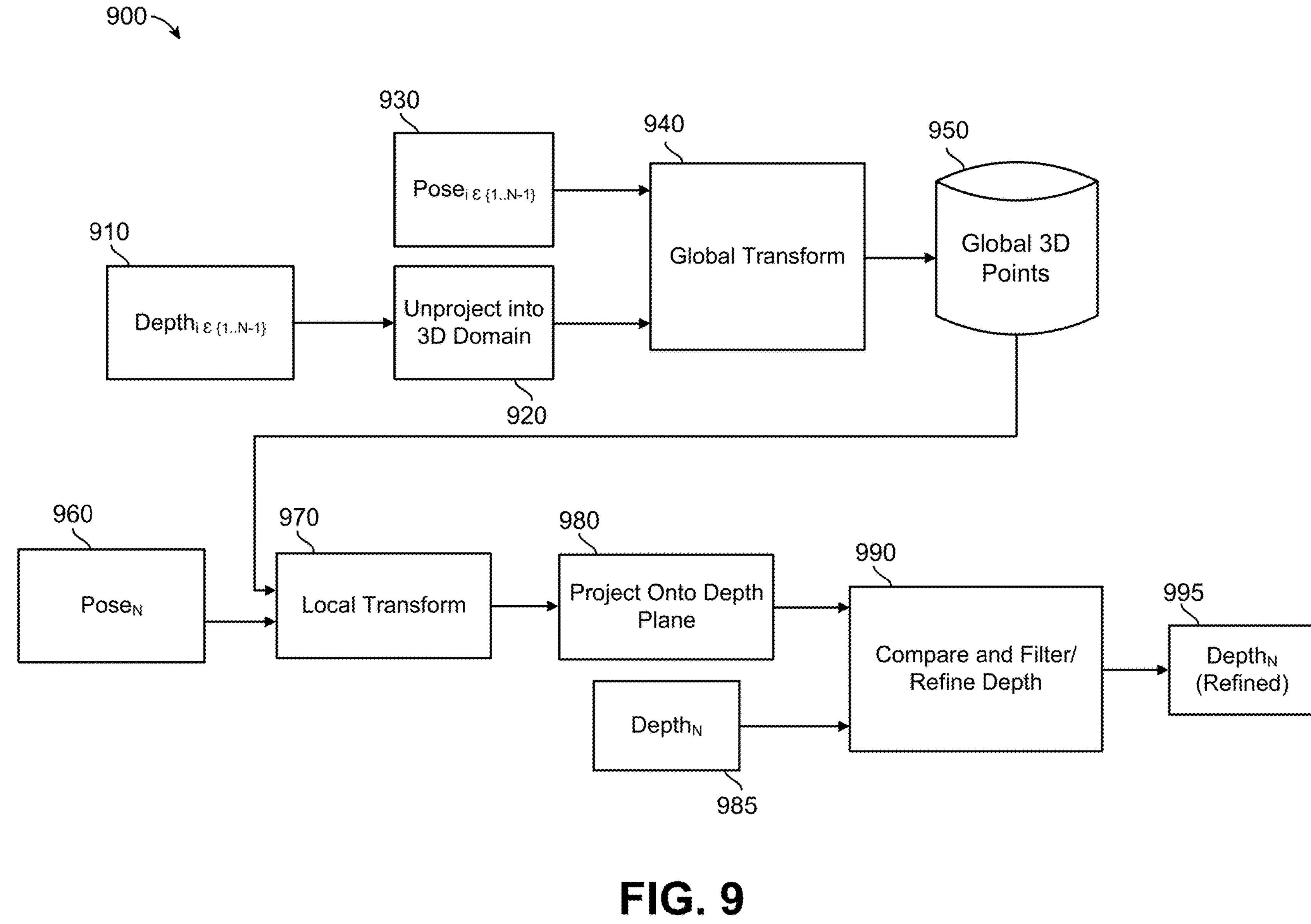
FIG. 9 is a block diagram illustrating an example of a procedure for refining depth predictions, in accordance with some examples.
Figure 10:
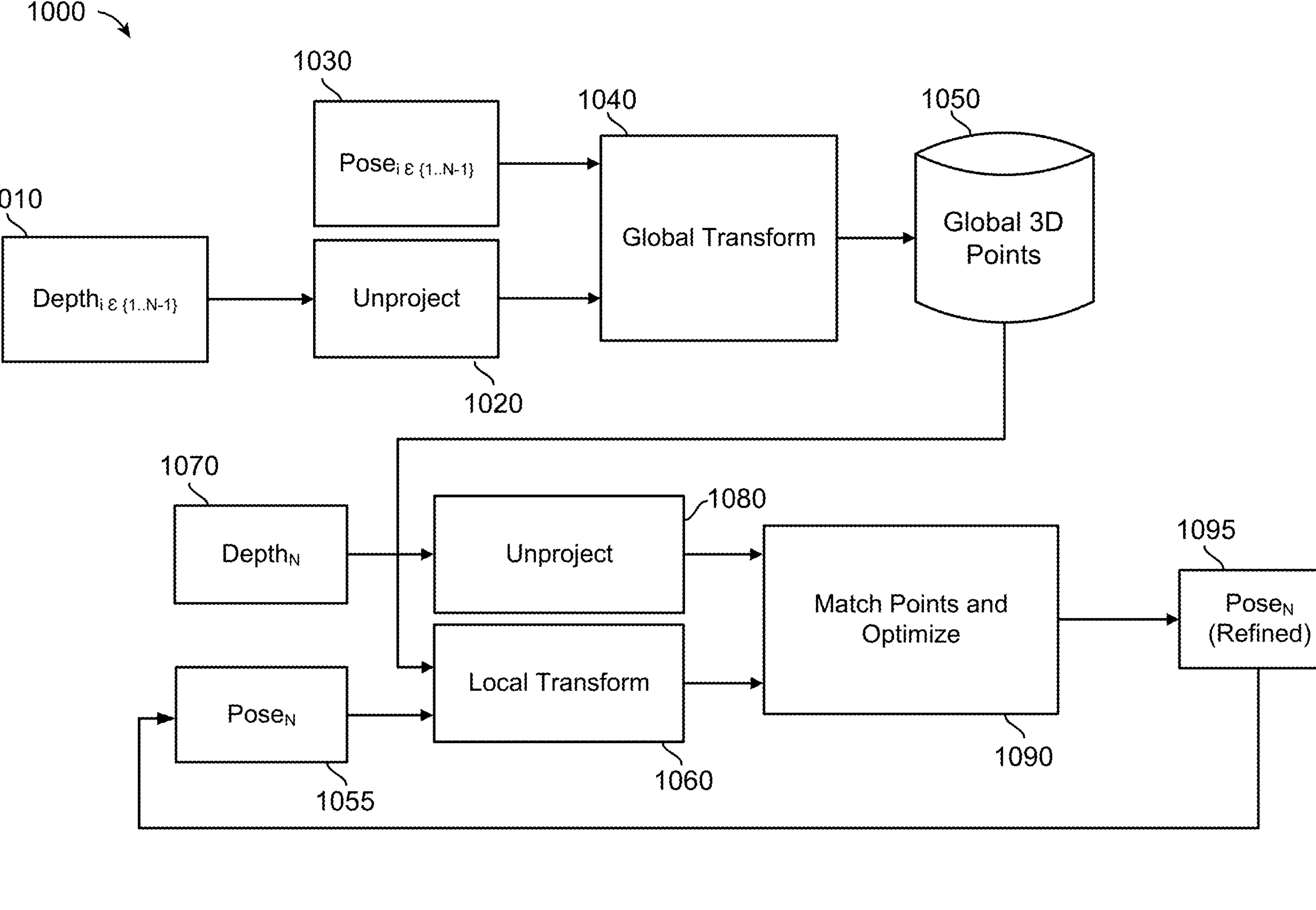
FIG. 10 is a block diagram illustrating an example of a procedure for refining pose predictions, in accordance with some examples.

FIGS. 9 and 10 show examples of procedures for refining depth and pose predictions, respectively, which may be used as inputs to the procedure 800 for multi-frame 3DR of FIG. 8. In particular, FIG. 9 is a block diagram illustrating an example of a procedure 900 for refining depth predictions. For this procedure 900, it can be assumed that the camera 6 DoF pose prediction (e.g., estimation) is more reliable than the depth prediction (e.g., estimation).

Figure 12:
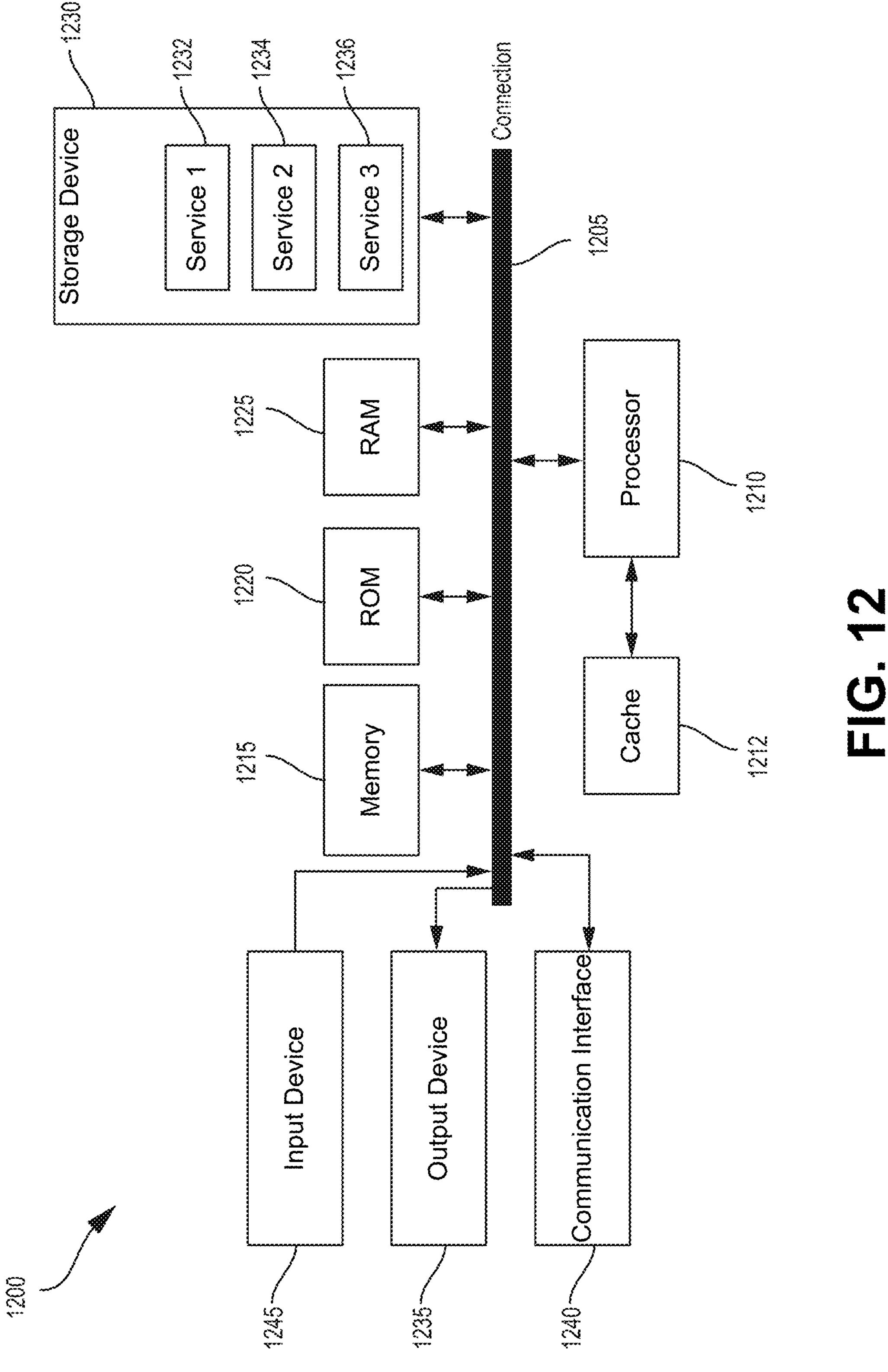
FIG. 12 is a diagram illustrating an example of a system for implementing certain aspects described herein.

In one or more examples, during operation of the procedure 900 of FIG. 9, one or more processors (e.g., processor 1210 of FIG. 12 or other processor(s)) may obtain a plurality of depth frames 910 (e.g., previous depth frames, such as depth frames 1 . . . N−1). Each of the depth frames 910 corresponds to a pose of a plurality of poses 960 (e.g., depth $\text{frame}_N$ corresponds to $\text{pose}_N$). Each of the depth frames 910 includes depth prediction values for pixels that correspond to a plurality of sample locations of a block (e.g., a voxel, such as voxel 600 of FIG. 6) of a scene. For example, a depth frames can include a depth prediction for each pixel location in the depth frame (e.g., a first depth prediction for a first pixel, a second depth prediction for a second pixel, and so on), and each pixel in the depth frame can correspond to multiple voxels in a 3D space.

At block 920, the one or more processors may unproject the depth prediction values of the depth frames 910 at pixel values onto the 3D space to obtain 3D points of the depth prediction values in a camera coordinate space (e.g., a camera coordinate system). As such, in one or more examples, every depth prediction value at every pixel may be converted to a 3D point (Xc,Yc,Zc) in the camera coordinate space.

The one or more processors (e.g., processor 1210 of FIG. 12 or other processor(s)) may obtain the plurality of poses 930 (e.g., previous poses, such as poses 1 . . . N−1). At block 940 of FIG. 9, the one or more processors can convert (e.g., perform a global transform of) the 3D points of the depth prediction values in the camera coordinate space to 3D points in a global or world reference frame (e.g., global or world coordinate space) using a global transform to produce global 3D points of the depth prediction values. The one or more processors can utilize the poses 930 corresponding to the depth frames 910 to perform the global transform. For example, the one or more processors can convert the 3D points of a depth $\text{frame}_N$ from the camera coordinate space to a world coordinate space using a corresponding 6-DoF $\text{pose}_N$ of the depth $\text{frame}_N$. As such, 3D points (Xc,Yc,Zc) in the camera coordinate space can be converted to global 3D points (Xw,Yw,Zw) in the global reference frame.

At block 950 (e.g., in the form of a database), the global 3D points of the depth prediction values in the global reference frame may be stored into memory (e.g., memory 1215 of FIG. 12).

The one or more processors (e.g., processor 1210 of FIG. 12 or other processor(s)) may obtain a current pose 960 (e.g., a new current pose, such as pose N). In one or more examples, the current pose 960 may be associated with a local reference frame (e.g., a current camera pose reference frame). At block 970 of FIG. 9, the one or more processors may transform (e.g., perform a local transformation of) the global 3D points of the depth prediction values from the global reference frame to the local reference frame to produce 3D points of the depth prediction values in the local reference frame. As such, the one or more processors can transform the global 3D points from the global reference frame to the local reference frame using the current pose 960, such that $Xc,Yc,Zc,1=\text{Pose}_{N(4\times4)}*[Xw,Yw,Zw,1]$.

At block 980 of FIG. 9, the one or more processors can project the 3D points of the depth prediction values in the local reference frame onto a depth plane associated with the current pose 960 and including current depth prediction values.

The one or more processors (e.g., processor 1210 of FIG. 12 or other processor(s)) may obtain a current depth frame 985 (e.g., a new current depth frame, such as depth N) that corresponds to the current pose 960 and includes current depth prediction values that correspond to the sample locations. At block 990, the one or more processors can refine the current depth frame 985 by comparing the depth prediction values from the previous depth frames 910 to the current depth prediction values from the current depth frame 985 to produce a refined current depth frame 995 (e.g., depth N (refined)).

FIG. 10 is a block diagram illustrating an example of a procedure 1000 for refining pose predictions. For procedure 1000, it can be assumed that the depth prediction (e.g., estimation) is more reliable than the camera 6 DoF pose prediction (e.g., estimation).

In some examples, during operation of the procedure 1000 of FIG. 10, one or more processors (e.g., processor 1210 of FIG. 12 or other processor(s)) may obtain a plurality of depth frames 1010 (e.g., previous depth frames, such as depth frames 1 . . . N−1), where each of the depth frames 1010 corresponds to a pose of a plurality of poses 1030 (e.g., depth $frame_N$ corresponds to $pose_N$). Each of the depth frames 1010 includes depth prediction values for pixels that correspond to a plurality of sample locations of a block (e.g., a voxel, such as voxel 600 of FIG. 6) of a scene.

At block 1020, the one or more processors can unproject the depth prediction values of the depth frames 1010 at pixel values onto a 3D space to obtain 3D points of the depth prediction values in a camera coordinate space (e.g., a camera coordinate system). As such, every depth prediction value at every pixel can be converted to a 3D point (Xc, Yc,Zc) in the camera coordinate space.

The one or more processors (e.g., processor 1210 of FIG. 12 or other processor(s)) may obtain the plurality of poses 1030 (e.g., previous poses, such as poses 1 . . . N−1). At block 1040 of FIG. 10, the one or more processors may convert (e.g., perform a global transform of) the 3D points of the depth prediction values in the camera coordinate space to 3D points in a global or world reference frame (e.g., global or world coordinate space) using a global transform to produce global 3D points of the depth prediction values. The one or more processors can utilize the poses 1030 corresponding to the depth frames 1010 to perform the global transform. For example, the one or more processors can convert the 3D points of a depth $frame_N$ from the camera coordinate space to a world coordinate space using a corresponding 6-DoF $pose_N$ of the depth $frame_N$. As such, in one or more examples, 3D points (Xc,Yc,Zc) in the camera coordinate space can be converted to global 3D points (Xw,Yw,Zw) in the global reference frame. E At block 1050 (e.g., in the form of a database), the global 3D points of the depth prediction values in the global reference frame in the global reference frame may be stored into memory (e.g., memory 1215 of FIG. 12).

The one or more processors may obtain a current pose 1055 (e.g., a new current pose, such as pose N). The current pose 1055 may be associated with a local reference frame (e.g., a current camera pose reference frame). At block 1070, the one or more processors may transform (e.g., perform a local transformation of) the global 3D points of the depth prediction values from the global reference frame to the local reference frame to produce 3D points of the depth prediction values in the local reference frame. As such, the one or more processors can transform the global 3D points from the global reference frame to the local reference frame using the current pose 1055, such that Xc,Yc,Zc,1= $Pose_{N(4\times4)}$*[Xw,Yw,Zw,1].

In one or more examples, the one or more processors may obtain a current depth frame 1070 (e.g., a new current depth frame, such as depth N) that corresponds to the current pose 1055 and includes current depth prediction values that correspond to the sample locations. At block 1080, the one or more processors may unproject the current depth prediction values of the current depth frame 1070 at pixel values onto the local reference frame to obtain 3D points of the current depth prediction values in the local reference frame.

At block 1090, the one or more processors can match the 3D points of the depth prediction values in the local reference frame with the 3D points of the current depth prediction values in the local reference frame to produce matched 3D points. At block 1095, the one or more processors can refine the current pose 1055 (e.g., to generate a refined $pose_N$) by optimizing the distance (e.g., adjusting the pose to minimize the distance) between the matched 3D points.

Figure 11:
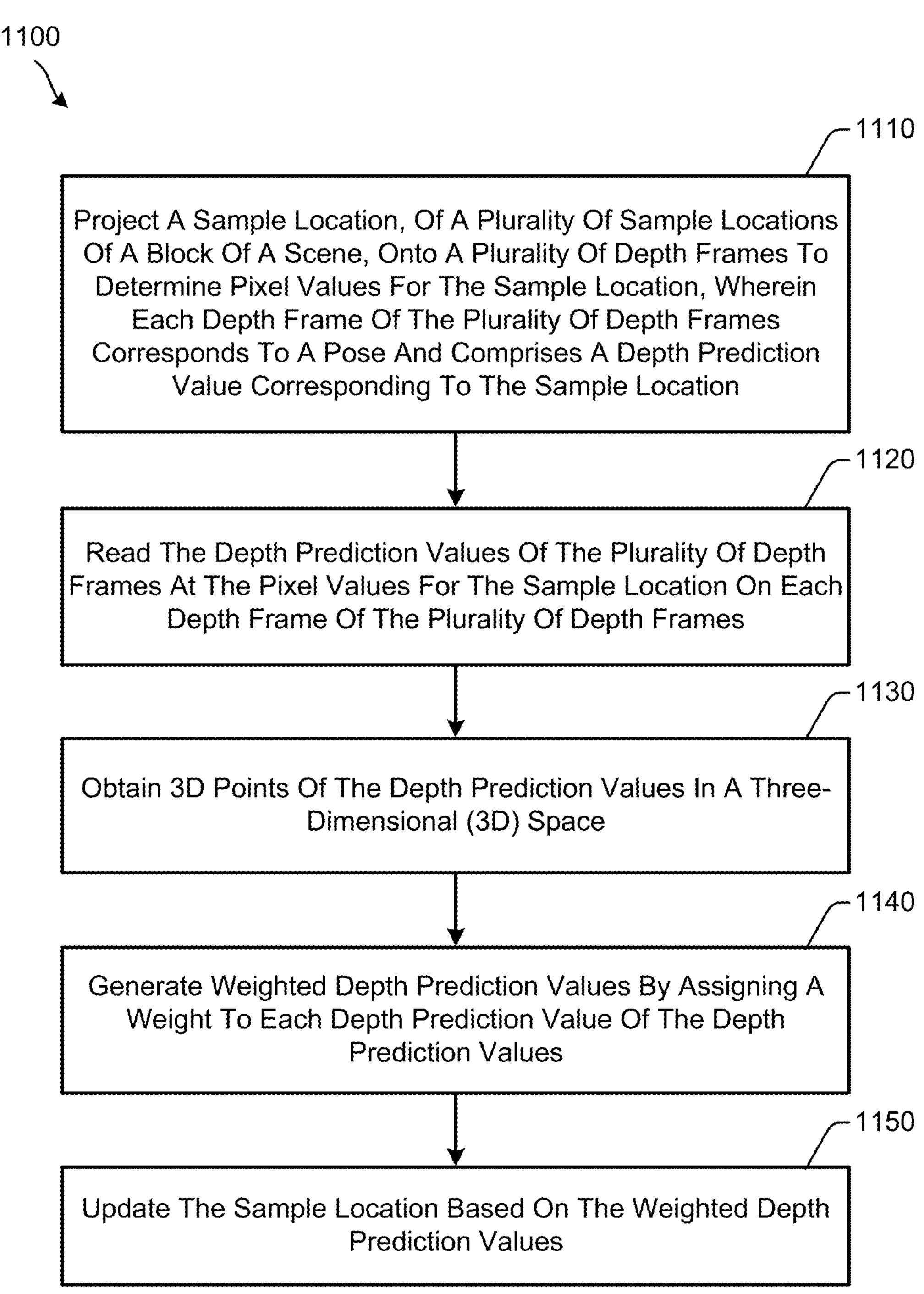
FIG. 11 is a flow diagram illustrating an example of a process for multi-frame 3D reconstruction, in accordance with some examples.

FIG. 11 is a flow chart illustrating an example of a process 1100 for multi-frame 3D reconstruction. The process 1100 can be performed by a computing device, or by a component or system (e.g., a chipset) of the computing device. The operations of the process 1100 may be implemented as software components that are executed and run on one or more processors (e.g., processor 1210 of FIG. 12 or other processor(s)).

At block 1110, the computing device (or component thereof) can project a sample location, of a plurality of sample locations of a block (e.g., a voxel) of a scene, onto a plurality of depth frames to determine pixel values for the sample location. Each depth frame of the plurality of depth frames corresponds to a pose and comprises a depth prediction value corresponding to the sample location. In some cases, the pixel values comprise two-dimensional (2D) coordinates. In some aspects, the computing device (or component thereof) can remove outlier depth prediction values from the depth prediction values based on a variance of the depth prediction values.

At block 1120, the computing device (or component thereof) can read the depth prediction values of the plurality of depth frames at the pixel values for the sample location on each depth frame of the plurality of depth frames.

At block 1130, the computing device (or component thereof) can obtain 3D points of the depth prediction values in a three-dimensional (3D) space. In some cases, the 3D space is a camera coordinate space. In some aspects, the computing device (or component thereof) can unproject the depth prediction values at the pixel values onto the 3D space to obtain the 3D points of the depth prediction values in the 3D space. In some cases, the computing device (or component thereof) can unproject the depth prediction values at the pixel values using camera intrinsic parameters.

At block 1140, the computing device (or component thereof) can generate weighted depth prediction values by assigning a weight to each depth prediction value of the depth prediction values. In some aspects, the computing device (or component thereof) can assign the weight to each depth prediction value of the depth prediction values based on a confidence level for each depth prediction value of the depth prediction values. In some cases, the computing device (or component thereof) can determine the confidence level for each depth prediction value of the depth prediction values using a variance of the depth prediction values.

At block 1150, the computing device (or component thereof) can update the sample location based on the weighted depth prediction values. In some aspects, to update the sample location, the computing device (or component thereof) can update a measure of distance for the sample location from a surface in the scene based on the weighted depth prediction values. In some cases, the measure of distance is determined by calculating a truncated signed distance function (TSDF) of the sample location based on the weighted depth prediction values.

As noted above, the process 1100 may be performed by a computing device or a component of the computing device. In some illustrative examples, the process 1100 can be performed by the image capture and processing system 100 of FIG. 1, the device 300 of FIG. 3, and/or one or more computing devices or systems (e.g., the computing system 1200 of FIG. 12). In some cases, such a computing device or apparatus may include a processor, microprocessor, microcomputer, or other component of a device that is configured to carry out the steps of the process 1100. In some examples, such computing device or apparatus may include one or more sensors configured to capture image data. For example, the computing device can include a smartphone, a head-mounted display, a mobile device, a camera, a tablet computer, or other suitable device. In some examples, such computing device or apparatus may include a camera configured to capture one or more images or videos. In some cases, such computing device may include a display for displaying images. In some examples, the one or more sensors and/or camera are separate from the computing device, in which case the computing device receives the sensed data. Such computing device may further include a network interface configured to communicate data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 1100 is illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1100 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 12 is a diagram illustrating an example of a system for implementing certain aspects of the present technology. In particular, FIG. 12 illustrates an example of computing system 1200, which can be for example any computing device making up internal computing system, a remote computing system, a camera, or any component thereof in which the components of the system are in communication with each other using connection 1205. Connection 1205 can be a physical connection using a bus, or a direct connection into processor 1210, such as in a chipset architecture. Connection 1205 can also be a virtual connection, networked connection, or logical connection.

In some embodiments, computing system 1200 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1200 includes at least one processing unit (CPU or processor) 1210 and connection 1205 that couples various system components including the memory unit 1215, such as read-only memory (ROM) 1220 and random access memory (RAM) 1225 to processor 1210. Computing system 1200 can include a cache 1212 of high-speed memory connected directly with, in close proximity to, or integrated as part of processor 1210.

Processor 1210 can include any general purpose processor and a hardware service or software service, such as services 1232, 1234, and 1236 stored in storage device 1230, configured to control processor 1210 as well as a special-purpose processor where software instructions are incorporated into the actual processor design. Processor 1210 may essentially be a completely self-contained computing system, containing multiple cores or processors, a bus, memory controller, cache, etc. A multi-core processor may be symmetric or asymmetric.

To enable user interaction, computing system 1200 includes an input device 1245, which can represent any number of input mechanisms, such as a microphone for speech, a touch-sensitive screen for gesture or graphical input, keyboard, mouse, motion input, speech, etc. Computing system 1200 can also include output device 1235, which can be one or more of a number of output mechanisms. In some instances, multimodal systems can enable a user to provide multiple types of input/output to communicate with computing system 1200. Computing system 1200 can include communications interface 1240, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1240 may also include one or more Global Navigation Satellite System (GNSS) receivers or transceivers that are used to determine a location of the computing system 1200 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1230 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1230 can include software services, servers, services, etc., that when the code that defines such software is executed by the processor 1210, it causes the system to perform a function. In some embodiments, a hardware service that performs a particular function can include the software component stored in a computer-readable medium in connection with the necessary hardware components, such as processor 1210, connection 1205, output device 1235, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, an engine, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, engines, circuits, and algorithm steps described in connection with the embodiments disclosed herein may be implemented as electronic hardware, computer software, firmware, or combinations thereof. To clearly illustrate this interchangeability of hardware and software, various illustrative components, blocks, engines, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as engines, modules, or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1. A method for three-dimensional reconstruction (3DR) of a scene, the method comprising: projecting a sample location, of a plurality of sample locations of a block of a scene, onto a plurality of depth frames to determine pixel values for the sample location, wherein each depth frame of the plurality of depth frames corresponds to a pose and comprises a depth prediction value corresponding to the sample location; reading the depth prediction values of the plurality of depth frames at the pixel values for the sample location on each depth frame of the plurality of depth frames; obtaining 3D points of the depth prediction values in a three-dimensional (3D) space; generating weighted depth prediction values by assigning a weight to each depth prediction value of the depth prediction values; and updating the sample location based on the weighted depth prediction values.

Aspect 2. The method of Aspect 1, further comprising removing outlier depth prediction values from the depth prediction values based on a variance of the depth prediction values.

Aspect 3. The method of any one of Aspects 1 or 2, wherein the pixel values comprise two-dimensional (2D) coordinates.

Aspect 4. The method of any one of Aspects 1 to 3, wherein the 3D space is a camera coordinate space.

Aspect 5. The method of any one of Aspects 1 to 4, wherein the block is a voxel.

Aspect 6. The method of any one of Aspects 1 to 5, further comprising unprojecting the depth prediction values at the pixel values onto the 3D space to obtain the 3D points of the depth prediction values in the 3D space.

Aspect 7. The method of Aspect 6, wherein the unprojecting of the depth prediction values at the pixel values is performed using camera intrinsic parameters.

Aspect 8. The method of any one of Aspects 1 to 7, further comprising assigning the weight to each depth prediction value of the depth prediction values based on a confidence level for each depth prediction value of the depth prediction values.

Aspect 9. The method of Aspect 8, further comprising determining the confidence level for each depth prediction value of the depth prediction values using a variance of the depth prediction values.

Aspect 10. The method of any one of Aspects 1 to 9, wherein updating the sample location comprises updating a measure of distance for the sample location from a surface in the scene based on the weighted depth prediction values.

Aspect 11. The method of Aspect 10, wherein the measure of distance is determined by calculating a truncated signed distance function (TSDF) of the sample location based on the weighted depth prediction values.

Aspect 12. An apparatus for three-dimensional reconstruction (3DR) of a scene, the apparatus comprising: at least one memory; and at least one processor coupled to the at least one memory and configured to: project a sample location, of a plurality of sample locations of a block of a scene, onto a plurality of depth frames to determine pixel values for the sample location, wherein each depth frame of the plurality of depth frames corresponds to a pose and comprises a depth prediction value corresponding to the sample location; read the depth prediction values of the plurality of depth frames at the pixel values for the sample location on each depth frame of the plurality of depth frames; obtain 3D points of the depth prediction values in a three-dimensional (3D) space; generate weighted depth prediction values by assigning a weight to each depth prediction value of the depth prediction values; and update the sample location based on the weighted depth prediction values.

Aspect 13. The apparatus of Aspect 12, wherein the at least one processor is configured to remove outlier depth prediction values from the depth prediction values based on a variance of the depth prediction values.

Aspect 14. The apparatus of any one of Aspects 12 or 13, wherein the pixel values comprise two-dimensional (2D) coordinates.

Aspect 15. The apparatus of any one of Aspects 12 to 14, wherein the 3D space is a camera coordinate space.

Aspect 16. The apparatus of any one of Aspects 12 to 15, wherein the block is a voxel.

Aspect 17. The apparatus of any one of Aspects 12 to 16, wherein the at least one processor is configured to unproject the depth prediction values at the pixel values onto the 3D space to obtain the 3D points of the depth prediction values in the 3D space.

Aspect 18. The apparatus of Aspects 17, wherein the at least one processor is configured to unproject the depth prediction values at the pixel values using camera intrinsic parameters.

Aspect 19. The apparatus of any one of Aspects 12 to 18, wherein the at least one processor is configured to assign the weight to each depth prediction value of the depth prediction values based on a confidence level for each depth prediction value of the depth prediction values.

Aspect 20. The apparatus of Aspect 19, wherein the at least one processor is configured to determine the confidence level for each depth prediction value of the depth prediction values using a variance of the depth prediction values.

Aspect 21. The apparatus of any one of Aspects 12 to 20, wherein, to update the sample location, the at least one processor is configured to update a measure of distance for the sample location from a surface in the scene based on the weighted depth prediction values.

Aspect 22. The apparatus of Aspect 21, wherein, to determine the measure of distance, the at least one processor is configured to calculate a truncated signed distance function (TSDF) of the sample location based on the weighted depth prediction values.

Aspect 23. A non-transitory computer-readable medium having stored thereon instructions that, when executed by one or more processors, cause the one or more processors to perform operations according to any one of Aspects 1 to 11.

Aspect 24. An apparatus for three-dimensional reconstruction (3DR) of a scene including one or more means for performing operations according to any one of Aspects 1 to 11.

Aspect 25. A method for refining a depth map of a scene, the method comprising: obtaining a plurality of depth frames, wherein each depth frame of the plurality of depth frames corresponds to a pose of a plurality of poses and comprises depth prediction values corresponding to a plurality of sample locations of a block of the scene; unprojecting the depth prediction values at pixel values onto a three-dimensional (3D) space to obtain 3D points of the depth prediction values in a camera coordinate space; converting the 3D points of the depth prediction values in the camera coordinate space to 3D points in a global reference frame to produce global 3D points of the depth prediction values; converting 3D points of the plurality of poses in the camera coordinate space to 3D points in the global reference frame to produce global 3D points of the plurality of poses; transforming the global 3D points of the depth prediction values and the global 3D points of the plurality of poses from the global reference frame to a local reference frame associated with a current pose to produce 3D points of the depth prediction values in the local reference frame and 3D points of the plurality of poses in the local reference frame; projecting the 3D points of the depth prediction values in the local reference frame and the 3D points of the plurality of poses in the local reference frame onto a depth plane associated with the current pose and comprising current depth prediction values; and refining a current depth frame by comparing the depth prediction values with the current depth prediction values to produce a refined current depth frame.

Aspect 26. An apparatus for refining a depth map of a scene, the apparatus comprising at least one memory and at least one processor coupled to the at least one memory and configured to: obtain a plurality of depth frames, wherein each depth frame of the plurality of depth frames corresponds to a pose of a plurality of poses and comprises depth prediction values corresponding to a plurality of sample locations of a block of the scene; unproject the depth prediction values at pixel values onto a three-dimensional (3D) space to obtain 3D points of the depth prediction values in a camera coordinate space; convert the 3D points of the depth prediction values in the camera coordinate space to 3D points in a global reference frame to produce global 3D points of the depth prediction values; convert 3D points of the plurality of poses in the camera coordinate space to 3D points in the global reference frame to produce global 3D points of the plurality of poses; transform the global 3D points of the depth prediction values and the global 3D points of the plurality of poses from the global reference frame to a local reference frame associated with a current pose to produce 3D points of the depth prediction values in the local reference frame and 3D points of the plurality of poses in the local reference frame; project the 3D points of the depth prediction values in the local reference frame and the 3D points of the plurality of poses in the local reference frame onto a depth plane associated with the current pose and comprising current depth prediction values; and refine a current depth frame by comparing the depth prediction values with the current depth prediction values to produce a refined current depth frame.

Aspect 27. A non-transitory computer-readable medium having stored thereon instructions that, when executed by one or more processors, cause the one or more processors to perform operations according to Aspect 25.

Aspect 28. An apparatus for three-dimensional reconstruction (3DR) of a scene including one or more means for performing operations according to Aspect 25.

Aspect 29. A method for refining a pose of a scene, the method comprising: obtaining a plurality of depth frames, wherein each depth frame of the plurality of depth frames corresponds to a pose of a plurality of poses and comprises depth prediction values corresponding to a plurality of sample locations of a block of the scene; unprojecting the depth prediction values at pixel values onto a three-dimensional (3D) space to obtain 3D points of the depth prediction values in a camera coordinate space; converting the 3D points of the depth prediction values in the camera coordinate space to 3D points in a global reference frame to produce global 3D points of the depth prediction values; converting 3D points of the plurality of poses in the camera coordinate space to 3D points in the global reference frame to produce global 3D points of the plurality of poses; transforming the global 3D points of the depth prediction values and the global 3D points of the plurality of poses from the global reference frame to a local reference frame associated with a current pose to produce 3D points of the depth prediction values in the local reference frame and 3D points of the plurality of poses in the local reference frame; unprojecting current depth prediction values of a current depth frame at pixel values onto the local reference frame to obtain 3D points of the current depth prediction values in the local reference frame; matching the 3D points of the depth prediction values in the local reference frame with the 3D points of the current depth prediction values in the local reference frame to produce matched 3D points; and refining the current pose by optimizing a distance between the matched 3D points.

Aspect 30. An apparatus for refining a pose of a scene, the apparatus comprising at least one memory and at least one processor coupled to the at least one memory and configured to: obtain a plurality of depth frames, wherein each depth frame of the plurality of depth frames corresponds to a pose of a plurality of poses and comprises depth prediction values corresponding to a plurality of sample locations of a block of the scene; unproject the depth prediction values at pixel values onto a three-dimensional (3D) space to obtain 3D points of the depth prediction values in a camera coordinate space; convert the 3D points of the depth prediction values in the camera coordinate space to 3D points in a global reference frame to produce global 3D points of the depth prediction values; convert 3D points of the plurality of poses in the camera coordinate space to 3D points in the global reference frame to produce global 3D points of the plurality of poses; transform the global 3D points of the depth prediction values and the global 3D points of the plurality of poses from the global reference frame to a local reference frame associated with a current pose to produce 3D points of the depth prediction values in the local reference frame and 3D points of the plurality of poses in the local reference frame; unproject current depth prediction values of a current depth frame at pixel values onto the local reference frame to obtain 3D points of the current depth prediction values in the local reference frame; match the 3D points of the depth prediction values in the local reference frame with the 3D points of the current depth prediction values in the local reference frame to produce matched 3D points; and refine the current pose by optimizing a distance between the matched 3D points.

Aspect 31. A non-transitory computer-readable medium having stored thereon instructions that, when executed by one or more processors, cause the one or more processors to perform operations according to Aspect 29.

Aspect 32. An apparatus for three-dimensional reconstruction (3DR) of a scene including one or more means for performing operations according to Aspect 29.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more."

What is claimed is:

1. A method for three-dimensional reconstruction (3DR) of a scene, the method comprising:

projecting a sample location, of a plurality of sample locations of a block of a scene, onto a plurality of depth frames to determine pixel values for the sample location, wherein each depth frame of the plurality of depth frames corresponds to a pose and comprises a respective depth prediction value corresponding to the sample location, such that the sample location is evaluated across the plurality of depth frames, and wherein the pixel values for the sample location include a respective pixel value corresponding to each depth frame of the plurality of depth frames for the sample location;

reading the depth prediction values of the plurality of depth frames at the pixel values for the sample location on each depth frame of the plurality of depth frames;

obtaining 3D points of the depth prediction values in a three-dimensional (3D) space, wherein the 3D points provide depth estimates for the sample location, each 3D point corresponding to one of the depth prediction values for the sample location;

generating weighted depth prediction values by assigning a weight to each depth prediction value of the depth prediction values for the sample location; and updating the sample location based on the weighted depth prediction values for the sample location.

2. The method of claim 1, further comprising removing outlier depth prediction values from the depth prediction values based on a variance of the depth prediction values.

3. The method of claim 1, wherein the pixel values comprise two-dimensional (2D) coordinates.

4. The method of claim 1, wherein the 3D space is a camera coordinate space.

5. The method of claim 1, wherein the block is a voxel.

6. The method of claim 1, further comprising unprojecting the depth prediction values at the pixel values onto the 3D space to obtain the 3D points of the depth prediction values in the 3D space.

7. The method of claim 6, wherein the unprojecting of the depth prediction values at the pixel values is performed using camera intrinsic parameters.

8. The method of claim 1, further comprising assigning the weight to each depth prediction value of the depth prediction values based on a confidence level for each depth prediction value of the depth prediction values.

9. The method of claim 8, further comprising determining the confidence level for each depth prediction value of the depth prediction values using a variance of the depth prediction values.

10. The method of claim 1, wherein updating the sample location comprises updating a measure of distance for the sample location from a surface in the scene based on the weighted depth prediction values.

11. The method of claim 10, wherein the measure of distance is determined by calculating a truncated signed distance function (TSDF) of the sample location based on the weighted depth prediction values.

12. An apparatus for three-dimensional reconstruction (3DR) of a scene, the apparatus comprising:

at least one memory; and at least one processor coupled to the at least one memory and configured to:

project a sample location, of a plurality of sample locations of a block of a scene, onto a plurality of depth frames to determine pixel values for the sample location, wherein each depth frame of the plurality of depth frames corresponds to a pose and comprises a respective depth prediction value corresponding to the sample location, such that the sample location is evaluated across the plurality of depth frames, and wherein the pixel values for the sample location include a respective pixel value corresponding to each depth frame of the plurality of depth frames for the sample location;

read the depth prediction values of the plurality of depth frames at the pixel values for the sample location on each depth frame of the plurality of depth frames;

obtain 3D points of the depth prediction values in a three-dimensional (3D) space, wherein the 3D points provide depth estimates for the sample location, each 3D point corresponding to one of the depth prediction values for the sample location;

generate weighted depth prediction values by assigning a weight to each depth prediction value of the depth prediction values for the sample location; and update the sample location based on the weighted depth prediction values for the sample location.

13. The apparatus of claim 12, wherein the at least one processor is configured to remove outlier depth prediction values from the depth prediction values based on a variance of the depth prediction values.

14. The apparatus of claim 12, wherein the pixel values comprise two-dimensional (2D) coordinates.

15. The apparatus of claim 12, wherein the 3D space is a camera coordinate space.

16. The apparatus of claim 12, wherein the block is a voxel.

17. The apparatus of claim 12, wherein the at least one processor is configured to unproject the depth prediction values at the pixel values onto the 3D space to obtain the 3D points of the depth prediction values in the 3D space.

18. The apparatus of claim 17, wherein the at least one processor is configured to unproject the depth prediction values at the pixel values using camera intrinsic parameters.

19. The apparatus of claim 12, wherein the at least one processor is configured to assign the weight to each depth prediction value of the depth prediction values based on a confidence level for each depth prediction value of the depth prediction values.

20. The apparatus of claim 19, wherein the at least one processor is configured to determine the confidence level for each depth prediction value of the depth prediction values using a variance of the depth prediction values.

21. The apparatus of claim 12, wherein, to update the sample location, the at least one processor is configured to update a measure of distance for the sample location from a surface in the scene based on the weighted depth prediction values.

22. The apparatus of claim 21, wherein, to determine the measure of distance, the at least one processor is configured to calculate a truncated signed distance function (TSDF) of the sample location based on the weighted depth prediction values.

23. A non-transitory computer-readable medium having stored thereon instructions that, when executed by one or more processors, cause the one or more processors to:

project a sample location, of a plurality of sample locations of a block of a scene, onto a plurality of depth frames to determine pixel values for the sample location, wherein each depth frame of the plurality of depth frames corresponds to a pose and comprises a respective depth prediction value corresponding to the sample location, such that the sample location is evaluated across the plurality of depth frames, and wherein the pixel values for the sample location include a respective pixel value corresponding to each depth frame of the plurality of depth frames for the sample location;

read the depth prediction values of the plurality of depth frames at the pixel values for the sample location on each depth frame of the plurality of depth frames;

obtain 3D points of the depth prediction values in a three-dimensional (3D) space, wherein the 3D points provide depth estimates for the sample location, each 3D point corresponding to one of the depth prediction values for the sample location;

generate weighted depth prediction values by assigning a weight to each depth prediction value of the depth prediction values for the sample location; and update the sample location based on the weighted depth prediction values for the sample location.

* * * * *